(12) United States Patent
Abe et al.

(10) Patent No.: US 12,025,908 B2
(45) Date of Patent: Jul. 2, 2024

(54) IMAGING APPARATUS

(71) Applicant: FUJIFILM Corporation, Tokyo (JP)

(72) Inventors: Takuro Abe, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/822,078

(22) Filed: Aug. 24, 2022

(65) Prior Publication Data

US 2023/0102719 A1 Mar. 30, 2023

(30) Foreign Application Priority Data

Sep. 22, 2021 (JP) .................. 2021-154103

(51) Int. Cl.
*G03B 5/00* (2021.01)
*H04N 23/68* (2023.01)

(52) U.S. Cl.
CPC ............. *G03B 5/00* (2013.01); *H04N 23/685* (2023.01); *G03B 2205/0015* (2013.01)

(58) Field of Classification Search
CPC . G03B 5/00; G03B 2205/0015; H04N 23/685
See application file for complete search history.

(56) References Cited

U.S. PATENT DOCUMENTS

| 2007/0096677 A1 | 5/2007 | Hirunuma et al. |
| 2011/0129206 A1* | 6/2011 | Muramatsu ........ H04N 23/6812 396/55 |
| 2020/0007768 A1 | 1/2020 | Ohtsuka |

FOREIGN PATENT DOCUMENTS

| JP | 2007-102032 A | 4/2007 |
| JP | 2020-003665 A | 1/2020 |
| WO | 2020/013081 A1 | 1/2020 |

\* cited by examiner

*Primary Examiner* — Minh Q Phan
(74) *Attorney, Agent, or Firm* — Studebaker & Brackett PC

(57) ABSTRACT

Provided is an imaging apparatus that includes a movement restriction member that mechanically sandwiches a movable member. The imaging apparatus includes the movable member that includes an imaging element, a support member that supports the movable member within a plane that intersects an optical axis of the imaging element, and a movement restriction member that includes a first member and a second member. The first member and the second member move between sandwiching positions at which the first member and the second member sandwich a sandwiching target member provided on the movable member and non-sandwiching positions separated from the sandwiching target member, and at the sandwiching positions, the first member and the second member sandwich the sandwiching target member at at least two or more points.

17 Claims, 23 Drawing Sheets

FIG. 12
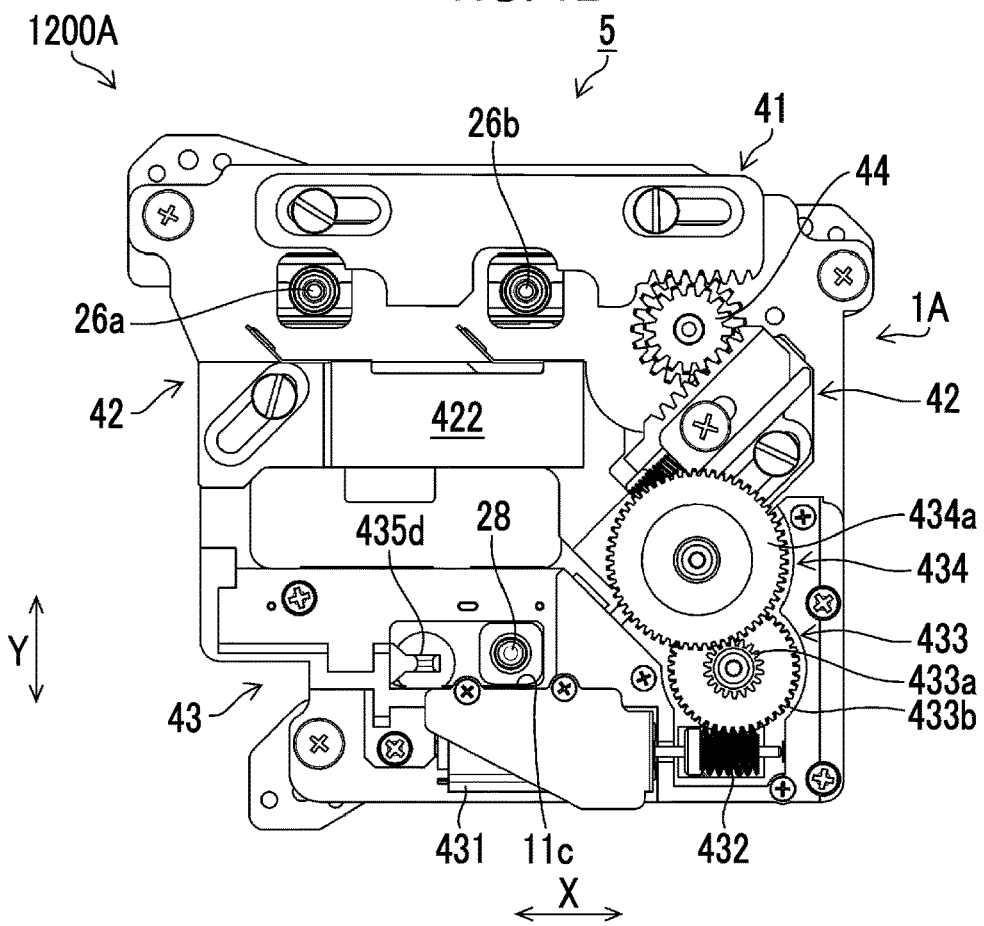
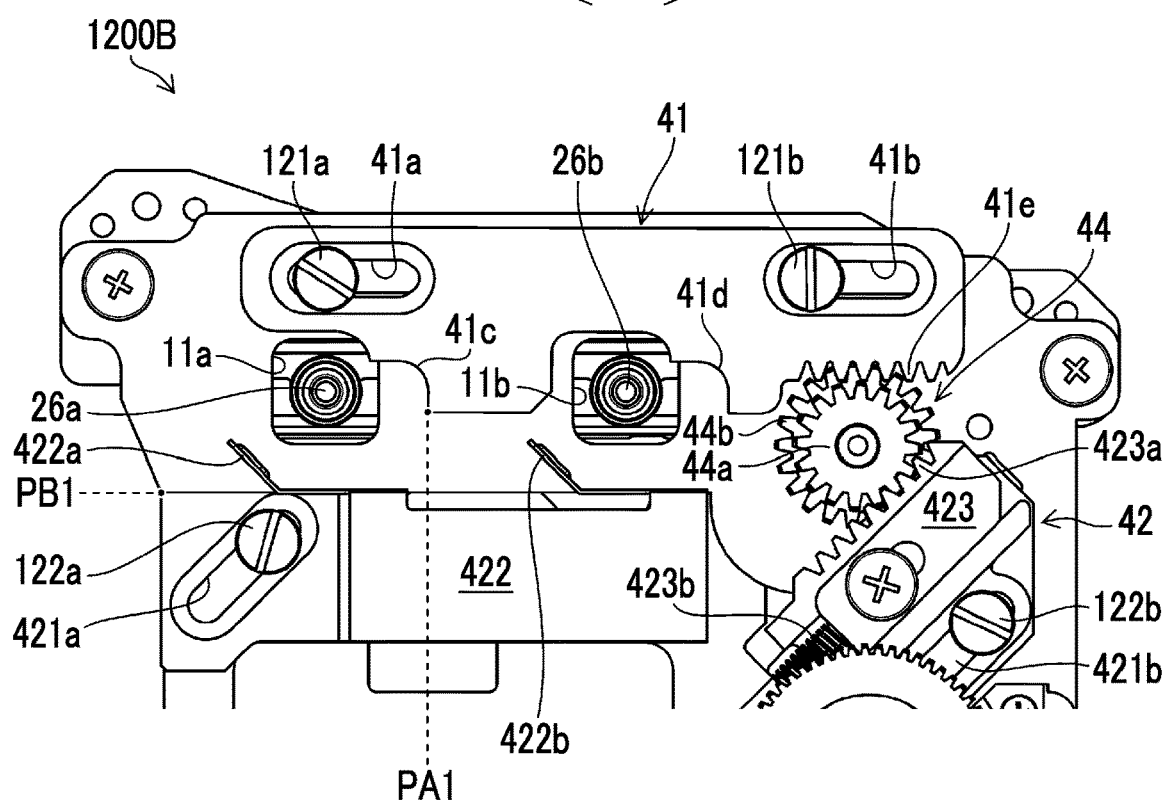

FIG. 13
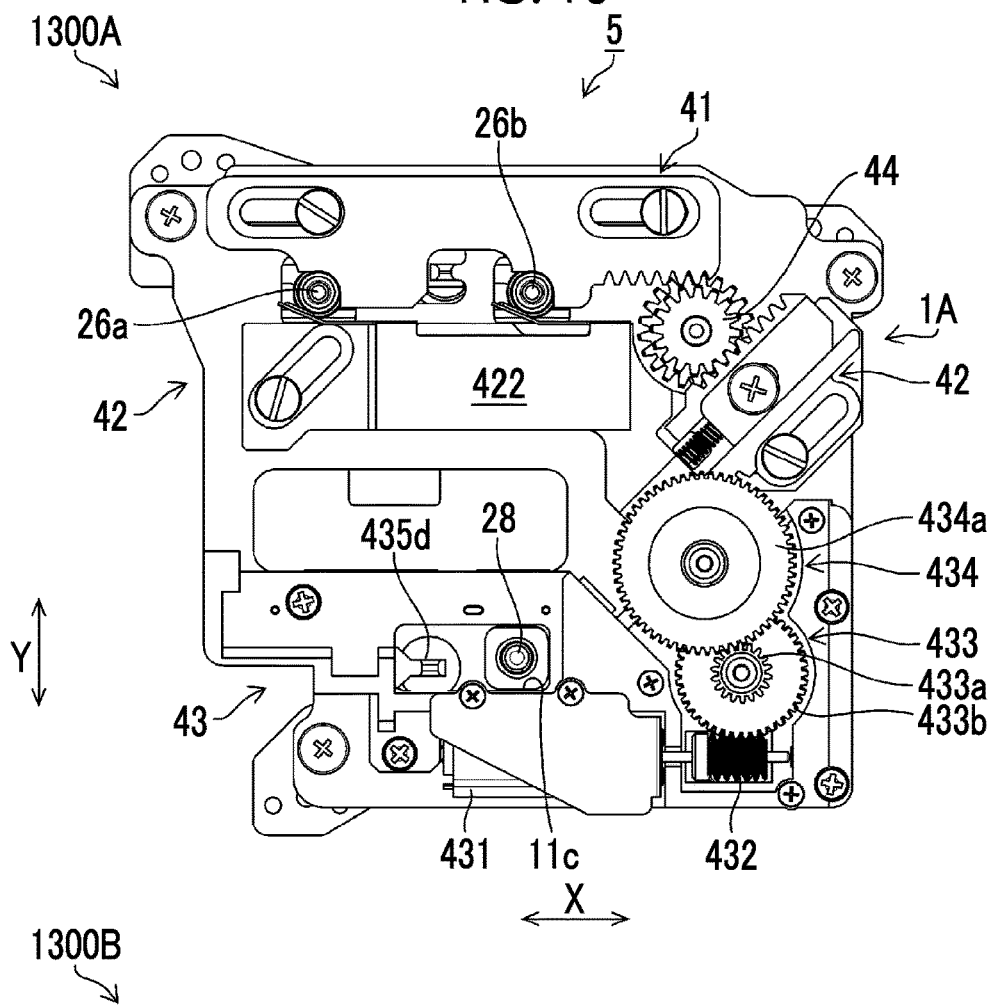
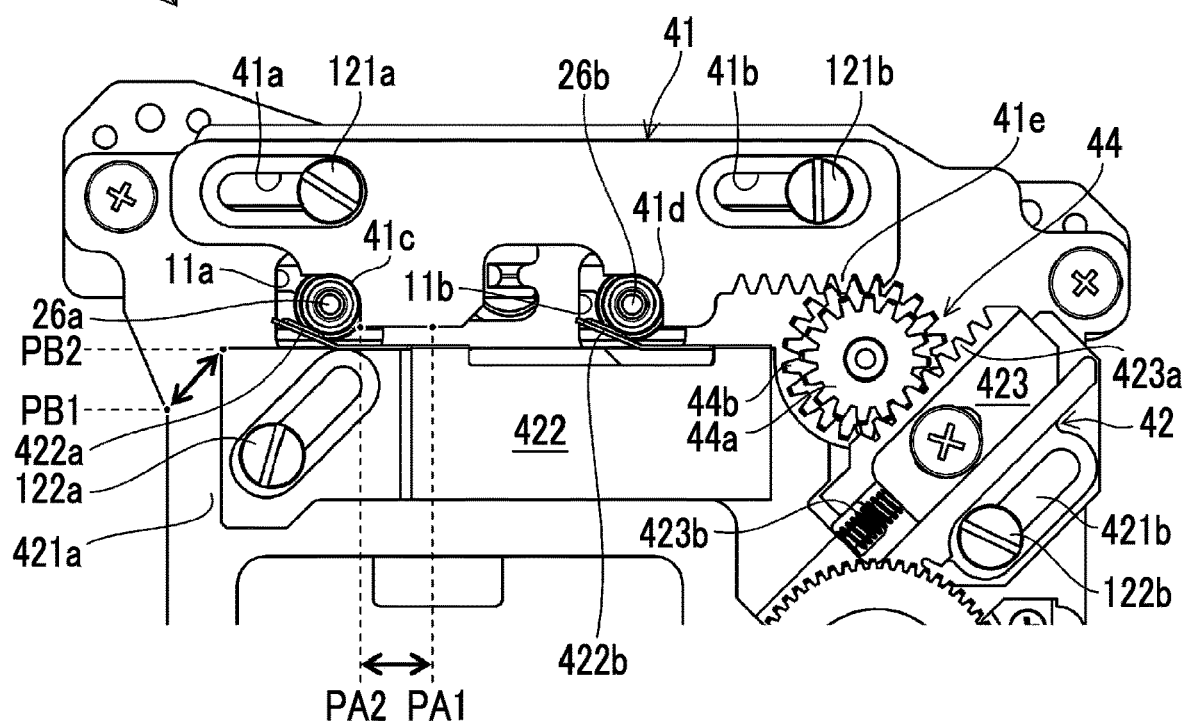

FIG. 18
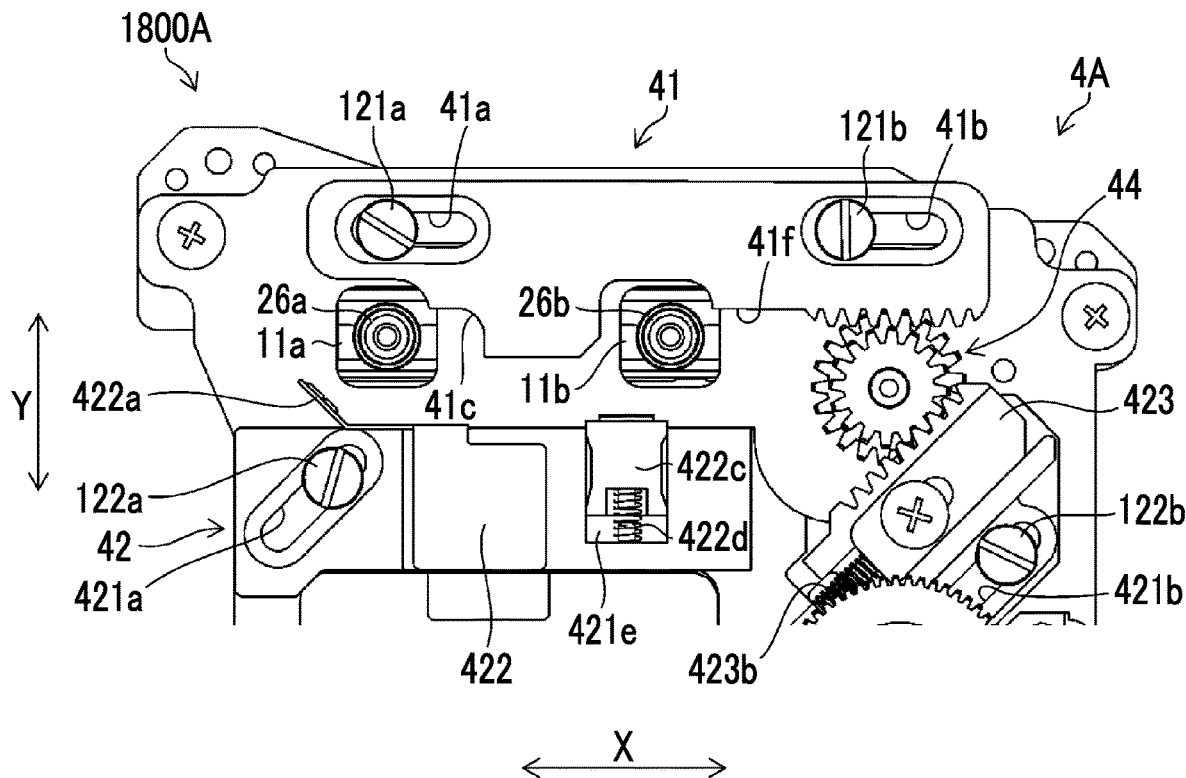
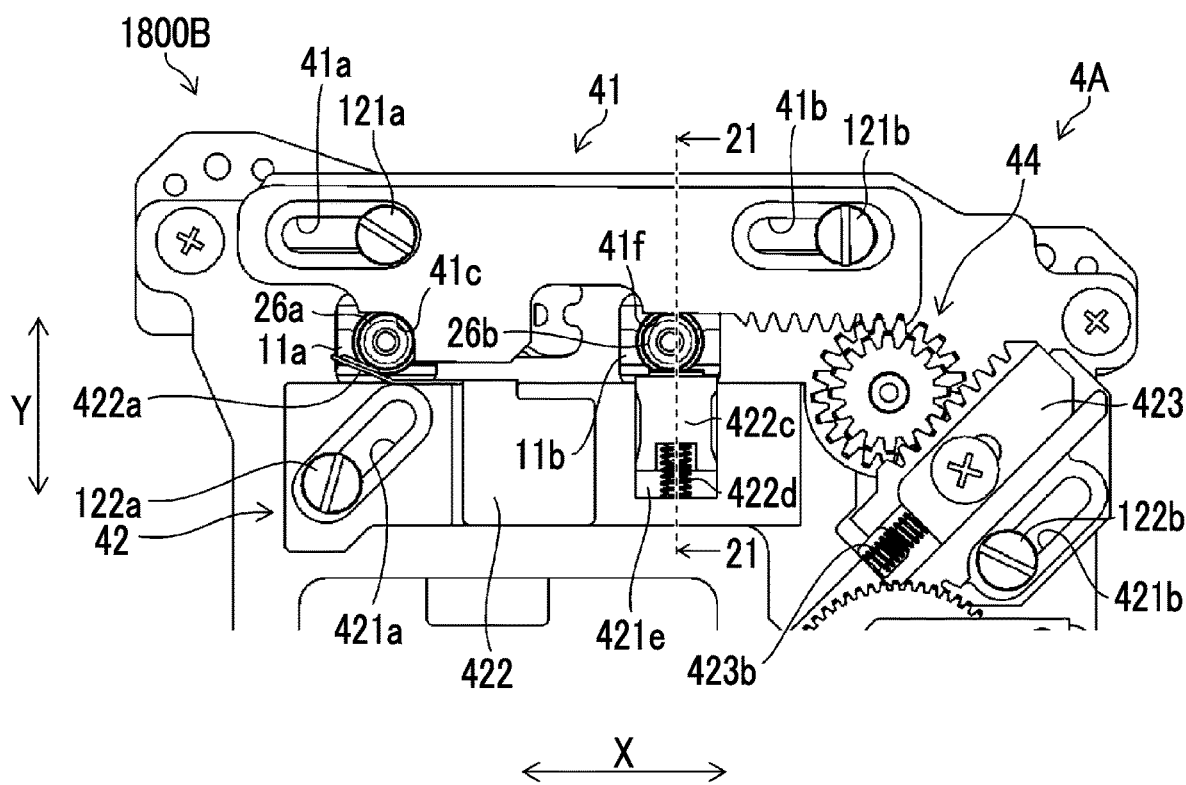

FIG. 21
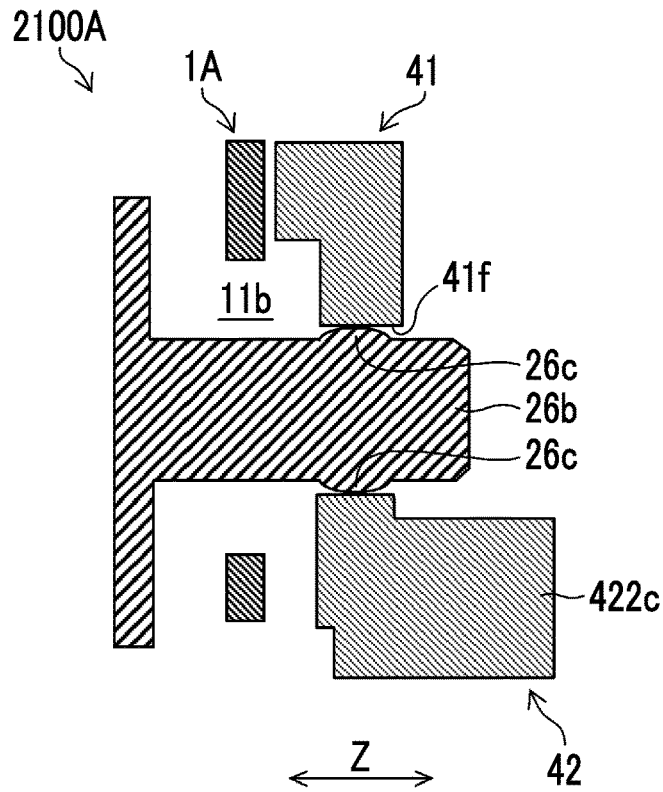
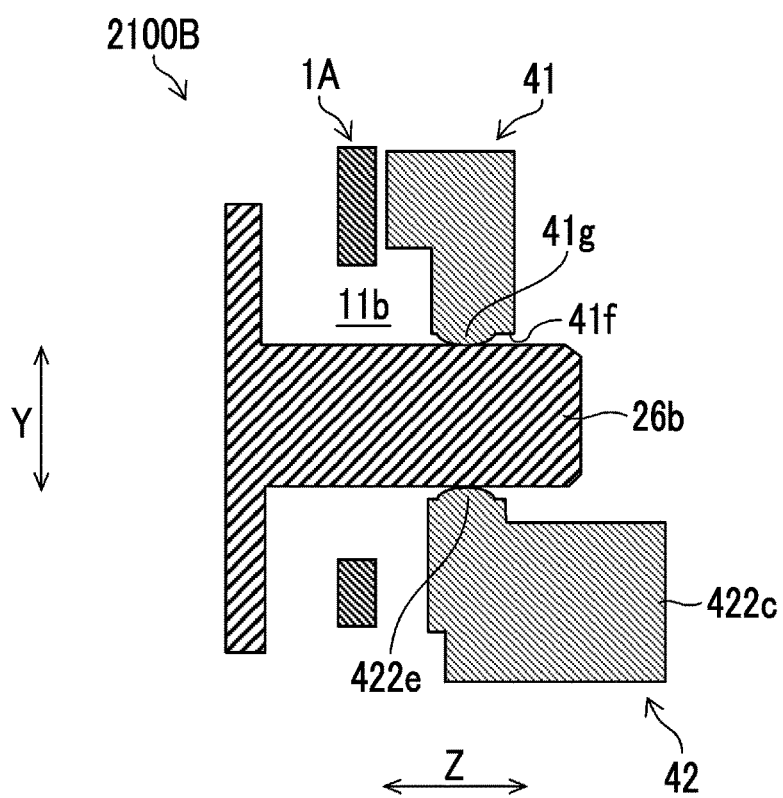

IMAGING APPARATUS

CROSS-REFERENCE TO RELATED APPLICATION

The present application claims priority under 35 U.S.C § 119(a) to Japanese Patent Application No. 2021-154103 filed on Sep. 22, 2021, which is hereby expressly incorporated by reference, in its entirety, into the present application.

BACKGROUND OF THE INVENTION

1. Field of the Invention

The present invention relates to an imaging apparatus.

2. Description of the Related Art

Disclosed in JP2007-102032A, JP2020-003665A, and WO2020/013081A is an imaging apparatus that has an image shake correction function of correcting a shake of a captured image (hereinafter, will be referred to as image shake) by moving an imaging element and a movement restriction function of restricting the movement of the imaging element.

SUMMARY OF THE INVENTION

An embodiment of the present disclosed technology provides an imaging apparatus that has a movement restriction function of mechanically restricting the movement of an imaging element.

According to a first aspect of the present invention, there is provided an imaging apparatus including a movable member that includes an imaging element, a support member that supports the movable member within a plane that intersects an optical axis of the imaging element, and a movement restriction member that includes a first member and a second member. The first member and the second member move between sandwiching positions at which the first member and the second member sandwich a sandwiching target member provided on the movable member and non-sandwiching positions separated from the sandwiching target member, and at the sandwiching positions, the first member and the second member sandwich the sandwiching target member at at least two or more points.

In the imaging apparatus according to a second aspect, the first member and the second member sandwich the sandwiching target member at three points, and a triangle connecting the three points is an acute-angled triangle.

In the imaging apparatus according to a third aspect, a longitudinal direction of the sandwiching target member is parallel to the optical axis, and the first member and the second member move between the sandwiching positions and the non-sandwiching positions within the plane intersecting the optical axis.

In the imaging apparatus according to a fourth aspect, the first member and the second member move in different directions within the plane intersecting the optical axis.

In the imaging apparatus according to a fifth aspect, the first member reaches the sandwiching position earlier than the second member in a case where the first member moves to the sandwiching position from the non-sandwiching position.

In the imaging apparatus according to a sixth aspect, the first member and the second member are different from each other in distance of movement between the sandwiching position and the non-sandwiching position and/or the first member and the second member are different from each other in speed of movement between the sandwiching position and the non-sandwiching position.

In the imaging apparatus according to a seventh aspect, a driving force that moves the first member in a direction toward the sandwiching position is larger than a driving force that moves the second member in a direction toward the sandwiching position.

In the imaging apparatus according to an eighth aspect, at least two sandwiching target members are provided, and the first member comes into contact with at least one of the at least two sandwiching target members at two points.

In the imaging apparatus according to a ninth aspect, the first member includes two long holes into which two shafts provided on the support member are inserted, and at the sandwiching position, one of the two shafts and one of the two long holes come into contact with each other at two points.

In the imaging apparatus according to a tenth aspect, the second member includes at least one elastic member, and at the sandwiching position, the elastic member biases at least one of the sandwiching target members.

In the imaging apparatus according to an eleventh aspect, the sandwiching target member includes an adjustment member for causing a center of the imaging element and an optical axis of an imaging optical system to coincide with each other.

In the imaging apparatus according to a twelfth aspect, the adjustment member consists of a third member provided on the movable member and a fourth member having a tubular shape, and a gap between the third member and the fourth member is filled with an ultraviolet-curable adhesive.

In the imaging apparatus according to a thirteenth aspect, the movable member includes three ball receiving surfaces that accommodate the support member or three balls disposed between the movable member and the support member, and the sandwiching target member is disposed inside a virtual triangle formed by the three ball receiving surfaces.

The imaging apparatus according to a fourteenth aspect includes a processor that controls operation of the movement restriction member, and the processor controls whether or not the movement restriction member restricts movement of the movable member in accordance with a specific condition.

In the imaging apparatus according to a fifteenth aspect, the imaging apparatus includes a power supply, and the specific condition is a state of the power supply.

In the imaging apparatus according to a sixteenth aspect, the imaging apparatus includes a user interface unit, and the specific condition is a state of operation with respect to the user interface unit.

In the imaging apparatus according to a seventeenth aspect, the imaging apparatus includes a sensor that detects an acceleration, and the processor performs control such that the movement restriction member restricts movement of the movable member in a case where the sensor detects an acceleration exceeding a range in which the movement of the movable member is allowed.

In the imaging apparatus according to an eighteenth aspect, the specific condition is a state of output of the sensor.

BRIEF DESCRIPTION OF THE DRAWINGS

FIG. 12 is a plan view for describing the operation of a movement restriction member in which the imaging unit is seen from the side opposite to the imaging optical system side.

FIG. 13 is a plan view for describing the operation of the movement restriction member in which the imaging unit is seen from the side opposite to the imaging optical system side.

FIG. 18 is a plan view for describing a movement restriction member according to another aspect.

FIG. 21 is a cross-sectional view taken along line 21-21 in FIG. 18.

DESCRIPTION OF THE PREFERRED EMBODIMENTS

Hereinafter, an embodiment of the present invention will be described with reference to the drawings.

Figure 1:
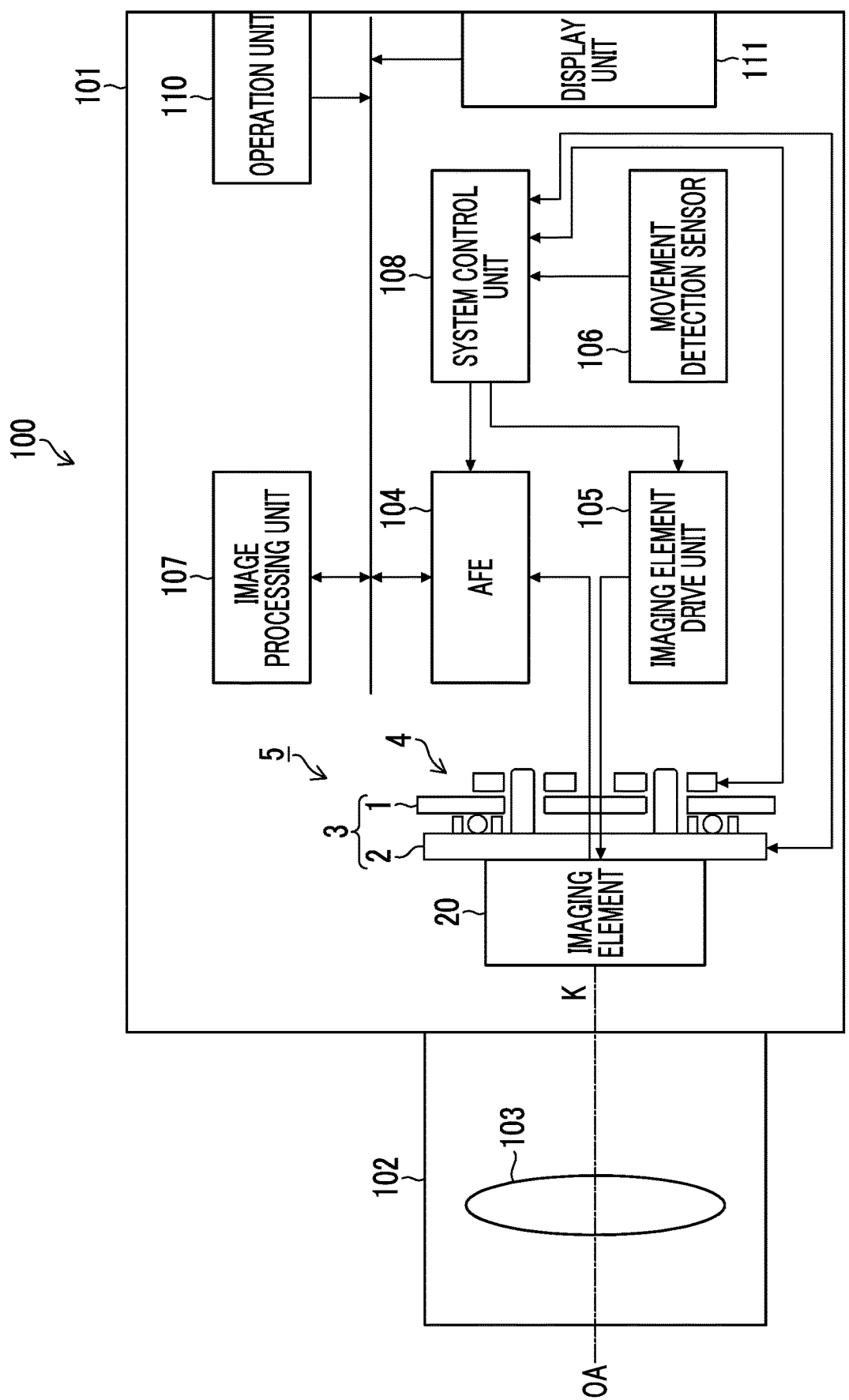
FIG. 1 is a diagram showing a schematic configuration of a digital camera, which is an embodiment of an imaging apparatus according to an embodiment of the present invention.

FIG. 1 is a diagram showing a schematic configuration of a digital camera 100, which is an embodiment of an imaging apparatus according to the embodiment of the present invention. The digital camera 100 is composed of a camera body 101 and an interchangeable lens 102 that can be attached to and detached from the camera body 101. In the embodiment, the digital camera 100 of which the interchangeable lens 102 can be attached and detached will be described. However, the digital camera 100 may be a lens-integrated type camera.

The digital camera 100 includes the camera body 101 and the interchangeable lens 102 including an imaging optical system 103. The camera body 101 includes an imaging unit 5 including an image shake correction device 3 and a movement restriction member 4, an imaging element drive unit 105 driving an imaging element 20, an analog front end (AFE) 104, an image processing unit 107, a movement detection sensor 106, an operation unit 110, a display unit 111, and a system control unit 108 that collectively controls the entire digital camera 100. The image shake correction device 3 includes a movable member 2 including the imaging element 20 and a support member 1 that movably supports the movable member 2.

The imaging optical system 103 includes a focus lens or a zoom lens and a stop.

The imaging element 20 images a subject through the imaging optical system 103 and includes a semiconductor chip on which a complementaly metal oxide semiconductor (CMOS) image sensor, a charge coupled device (CCD) image sensor, or the like is formed and a package that accommodates the semiconductor chip.

As will be described later, a light-receiving surface 20a (Refer to FIG. 3) of the imaging element 20 is rectangular.

As described above, the image shake correction device 3 includes the movable member 2 including the imaging element 20 and the support member 1 supporting the movable member 2, and the support member 1 supports the movable member 2 within a plane intersecting an optical axis K of the imaging element 20. The image shake correction device 3 corrects an image shake of a captured image captured by the imaging element 20 by moving the light-receiving surface 20a of the imaging element 20 within the plane intersecting the optical axis K of the imaging element 20. The optical axis K of the imaging element 20 is a virtual straight line that extends through a center P of the light-receiving surface 20a of the imaging element 20 and is orthogonal to the light-receiving surface 20a.

In the present specification, regarding the digital camera 100, a state where the light-receiving surface 20a of the imaging element 20 is perpendicular to the direction of gravitational force and the image shake correction device 3 has not been energized will be referred to as a standard state. In the standard state, an optical axis OA of the imaging optical system 103 and the optical axis K of the imaging element 20 basically coincide with each other.

Although the detailed configuration of the image shake correction device 3 will be described later, the image shake correction device 3 corrects an image shake by moving the movable member 2 including the imaging element 20 with respect to the support member 1 in three directions, that is, a first direction which is a lateral direction (direction X shown in FIG. 3) of the light-receiving surface 20a of the imaging element 20, a second direction which is a longitudinal direction (direction Y shown in FIG. 3) of the light-receiving surface 20a of the imaging element 20, and a third direction which is a direction (direction θ shown in FIG. 3)

along the circumference of a circle around the center P of the light-receiving surface 20a of the imaging element 20 in the standard state.

Although the detailed configuration of the movement restriction member 4 will be described later, the movement restriction member 4 is disposed on a side opposite to the movable member 2 with respect to the support member 1 and mechanically restricts the movement of the movable member 2 with respect to the support member 1.

The AFE 104 includes a signal processing circuit that performs correlative double sampling processing, digital conversion processing, and the like with respect to an imaging signal output from the imaging element 20.

The image processing unit 107 performs digital signal processing on the imaging signal processed by the AFE 104 to generate captured image data in a joint photographic experts group (JPEG) format or the like.

The movement detection sensor 106 is a sensor for detection of the movement of the digital camera 100 (camera body 101) and is composed of an acceleration sensor or an angular velocity sensor or is composed of both of an acceleration sensor and an angular velocity sensor.

The system control unit 108 controls the imaging element drive unit 105 and the AFE 104 such that the imaging element 20 images a subject, an imaging signal corresponding to a subject image is output from the imaging element 20, and a still image or a moving image for recording or a through-image is generated.

The operation unit 110 includes various operation members such as a release switch for managing the timing of the driving of a shutter (not shown), a user interface unit for various settings of an imaging mode or the like with respect to the digital camera 100, and a power switch.

The display unit 111 is provided on a rear surface of the camera body 101 and displays a captured still image, a motion picture including a moving image or a through-image, information (menu) related to operation, or the like. The user interface unit of the operation unit 110 also includes a touch panel disposed to overlap with the display unit 111.

The system control unit 108 controls the image shake correction device 3 based on movement information of the digital camera 100 detected by the movement detection sensor 106. The system control unit 108 controls the movement of the movable member 2 including the imaging element 20 such that the light-receiving surface 20a of the imaging element 20 is moved in at least one of the direction X, the direction Y, or the direction θ and thus an image shake of a captured image captured by the imaging element 20 is corrected.

In a case where there is no movement of the digital camera 100 detected by the movement detection sensor 106 in a state where the image shake correction device 3 has been energized, the system control unit 108 controls the operation of the image shake correction device 3 such that the position of the light-receiving surface 20a of the imaging element 20 becomes a position in the standard state.

The system control unit 108 controls the operation of the movement restriction member 4 to control whether or not the movement restriction member 4 restricts the movement of the movable member 2 in accordance with a specific condition.

(Processor)

In the above-described embodiment, the hardware structure of a processing unit that performs various processes in the imaging element drive unit 105, the analog front end (AFE) 104, the image processing unit 107, and the system control unit 108 is various processors as follows. The various processors include a CPU, which is a general-purpose processor that executes software (program) and functions as various processing units, a programmable logic device (PLD) such as a field programmable gate array (FPGA), which is a processor of which the circuit configuration can be changed after being manufactured, and a dedicated electric circuit such as an application specific integrated circuit (ASIC), which is a processor having a circuit configuration designed only for a specific process.

One processing unit may be composed of one of the various processors and may be composed of two or more same types of processors or two or more different types of processors (for example, plurality of FPGA or combination of CPU and FPGA). In addition, a plurality of processing units may be composed of one processor. As examples of a configuration in which a plurality of processing units are composed of one processor, firstly, there is a configuration in which one processor is composed of a combination of one or more CPUs and software and the processor functions as a plurality of processing units as represented by a computer such as a client, a server, or the like. Secondly, as represented by a system-on-chip (SoC), there is a configuration in which a processor that realizes, with one integrated circuit (IC), the functions of the entire system including a plurality of processing units is used. As described above, various processing units are configured by using one or more of the above-described various processors as the hardware structure.

Furthermore, the hardware structure of the various processors is, more specifically, an electric circuit (circuitry) in which circuit elements such as semiconductor elements are combined with each other.

Each of the above-described configurations and functions can be appropriately realized by any hardware, software, or a combination of any hardware and software. For example, application to a program that causes a computer to perform the above-described processing steps (processing procedure), a computer-readable recording medium (non-temporary recording medium) in which such a program is recorded, and a computer into which such a program can be installed is also possible.

Figure 2:
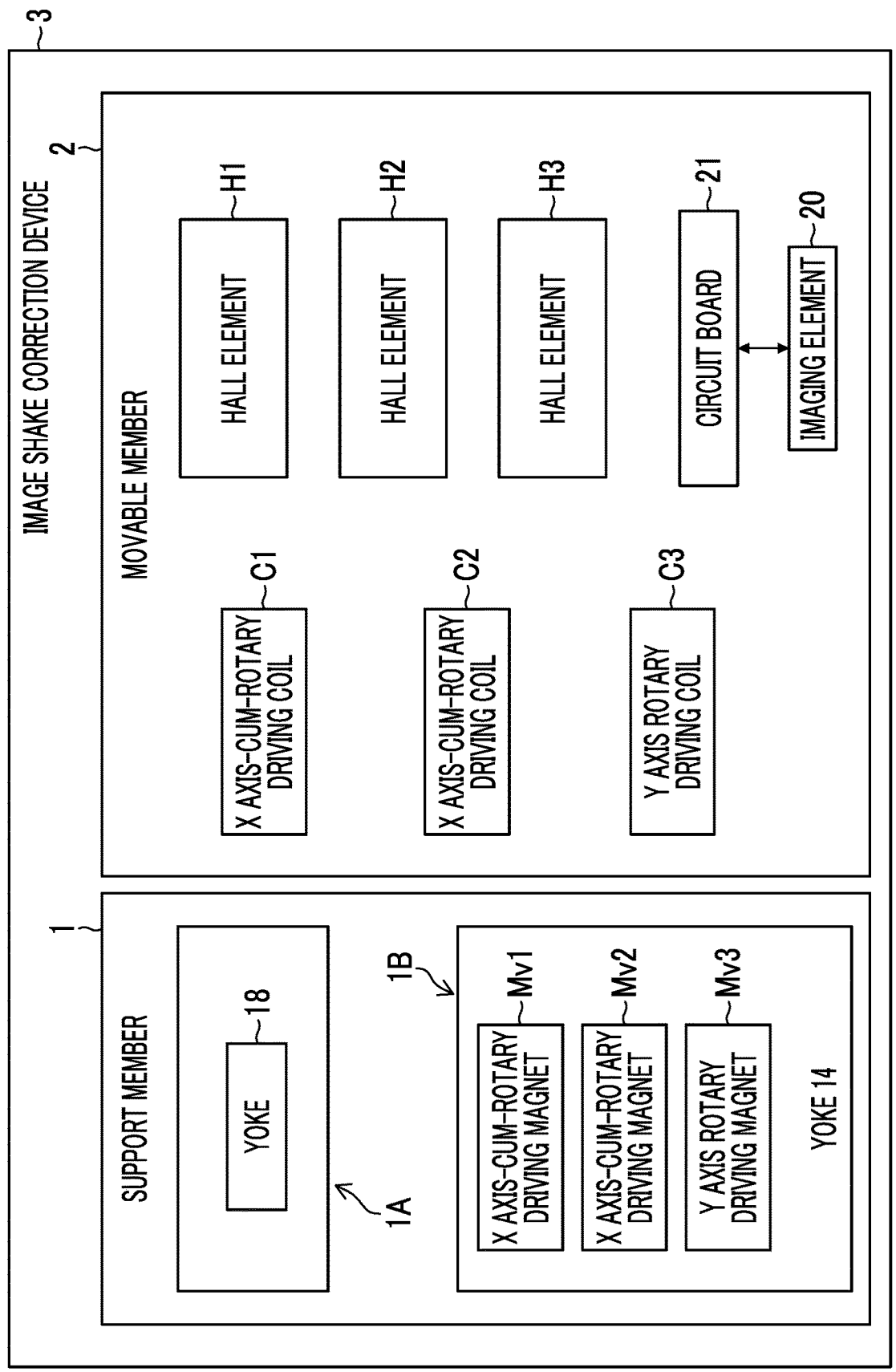
FIG. 2 is a diagram showing a schematic configuration of an image shake correction device in the digital camera shown in FIG. 1.

FIG. 2 is a diagram showing a schematic configuration of the image shake correction device 3 in the digital camera 100 shown in FIG. 1.

The image shake correction device 3 includes the movable member 2 that can move in each of the direction X, the direction Y, and the direction θ, and the support member 1 that supports the movable member 2 such that the movable member 2 can move in each of the direction X, the direction Y, and the direction θ.

A circuit board 21 onto which the imaging element 20 is fixed (mounted), an X axis-cum-rotary driving coil C1, an X axis-cum-rotary driving coil C2, and a Y axis driving coil C3 are fixed to the movable member 2.

Output signals of a Hall element H1, a Hall element H2, and a Hall element H3 are input to the system control unit 108.

The system control unit 108 moves the movable member 2 and corrects an image shake by controlling a control current flowing to the X axis-cum-rotary driving coil C1, a control current flowing to the X axis-cum-rotary driving coil C2, and a control current flowing to the Y axis driving coil C3 based on the output signals.

The support member 1 is composed of a first support member 1A and a second support member 1B, as described later.

An X axis-cum-rotary driving magnet Mv1, an X axis-cum-rotary driving magnet Mv2, and a Y axis driving magnet Mv3 are fixed to the first support member 1A.

The second support member 1B includes a yoke 18 (refer to FIG. 4) at a position facing the X axis-cum-rotary driving magnet Mv1, the X axis-cum-rotary driving magnet Mv2, and the Y axis driving magnet Mv3.

Figure 3:
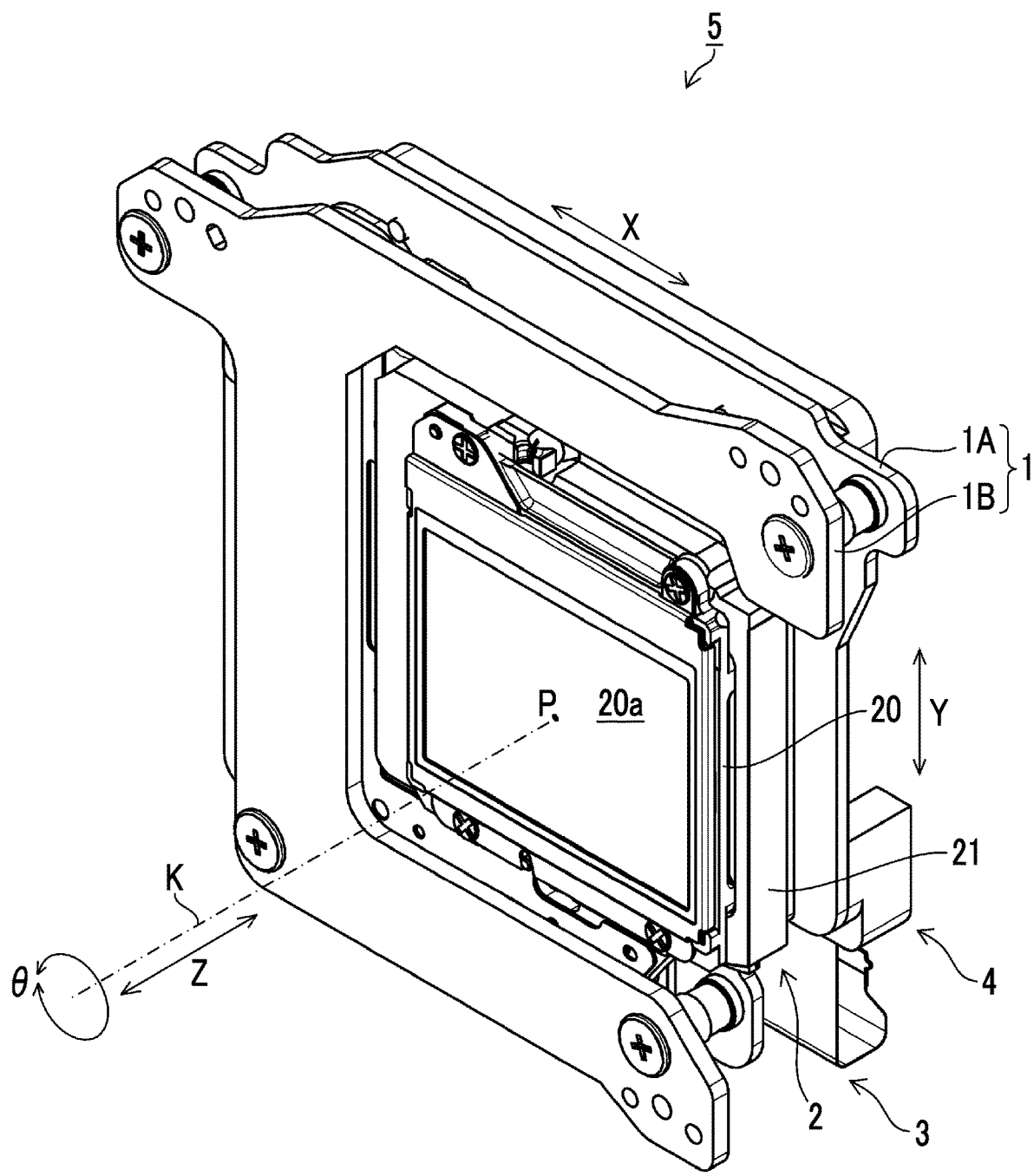
FIG. 3 is a perspective view of an imaging unit as seen from an imaging optical system side.

FIG. 3 is a perspective view of the imaging unit 5 as seen from the imaging optical system 103 side (front side). As described above, the imaging unit 5 includes the image shake correction device 3 and the movement restriction member 4, and the image shake correction device 3 includes the movable member 2 and the support member 1.

As shown in FIG. 3, the image shake correction device 3 includes the support member 1 composed of the first support member 1A and the second support member 1B and the movable member 2, to which the circuit board 21 with the imaging element 20 mounted thereon is fixed. The first support member 1A is disposed on a rear surface side (surface side opposite to light-receiving surface 20a side) of the movable member 2. The second support member 1B is disposed on a front surface side (light-receiving surface 20a side) of the movable member 2 and is fixed to the first support member 1A by being screwed or like in a state where the movable member 2 is interposed between the second support member 1B and the first support member 1A. The movement restriction member 4 is disposed on a rear surface side (surface side opposite to light-receiving surface 20a side) of the first support member 1A. Note that the configuration of the movement restriction member 4 will be described later.

The imaging unit 5 including the image shake correction device 3 and the movement restriction member 4 is fixed to the camera body 101 in a state where the light-receiving surface 20a faces the imaging optical system 103 shown in FIG. 1.

The image shake correction device 3 performs image shake correction by moving the movable member 2 in each of the direction θ that is perpendicular to the light-receiving surface 20a and that extends around the optical axis K extending through the center P of the light-receiving surface 20a, the direction X that is the longitudinal direction of the light-receiving surface 20a, and the direction Y that is the lateral direction of the light-receiving surface 20a.

Hereinafter, a direction extending along the optical axis K of the imaging element 20 will be referred to as a direction Z. In the embodiment, a plane that perpendicularly intersects the optical axis K is a plane within which the movable member 2 moves.

The movable member 2 can move in one direction in the direction X (leftward direction) and in the other direction of the direction X (rightward direction) by the same distance in the standard state.

In addition, the movable member 2 can move in one direction in the direction Y (upward direction) and in the other direction of the direction Y (downward direction) by the same distance in the standard state.

In addition, the movable member 2 can rotate in one direction in the direction θ (rightward rotation direction) and in the other direction of the direction θ (leftward rotation direction) by the same distance in the standard state.

In the case of the digital camera 100 shown in FIG. 1, a posture in which the direction Y is parallel to the direction of gravitational force as shown in FIG. 3 is an upright posture (posture for so-called horizontal photography).

Figure 4:
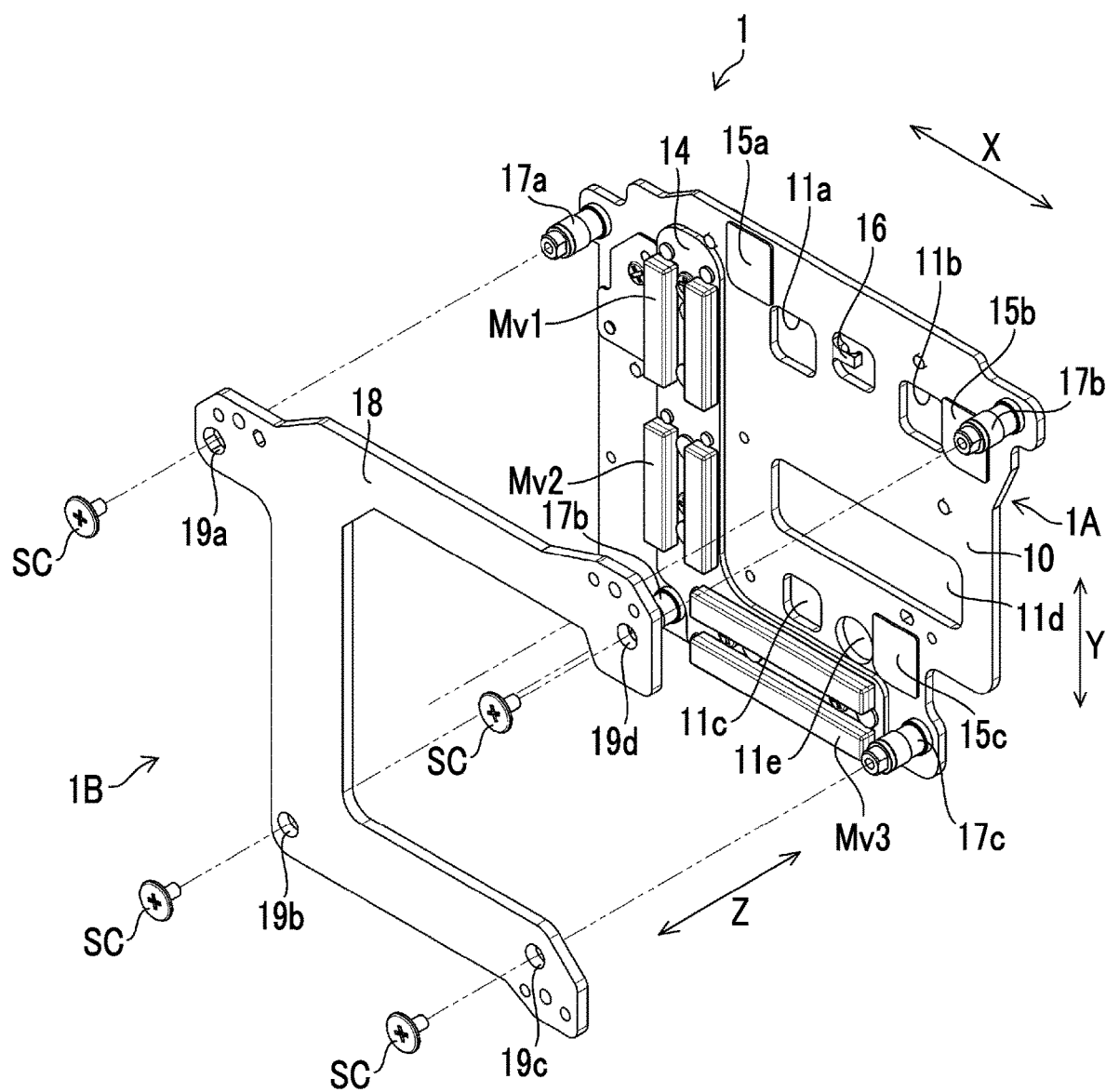
FIG. 4 is an exploded perspective view of a support member of the image shake correction device shown in FIG. 3 as seen from the imaging optical system side.

FIG. 4 is an exploded perspective view of the support member 1 of the image shake correction device 3 shown in FIG. 3 as seen from the imaging optical system 103 side.

Figure 5:
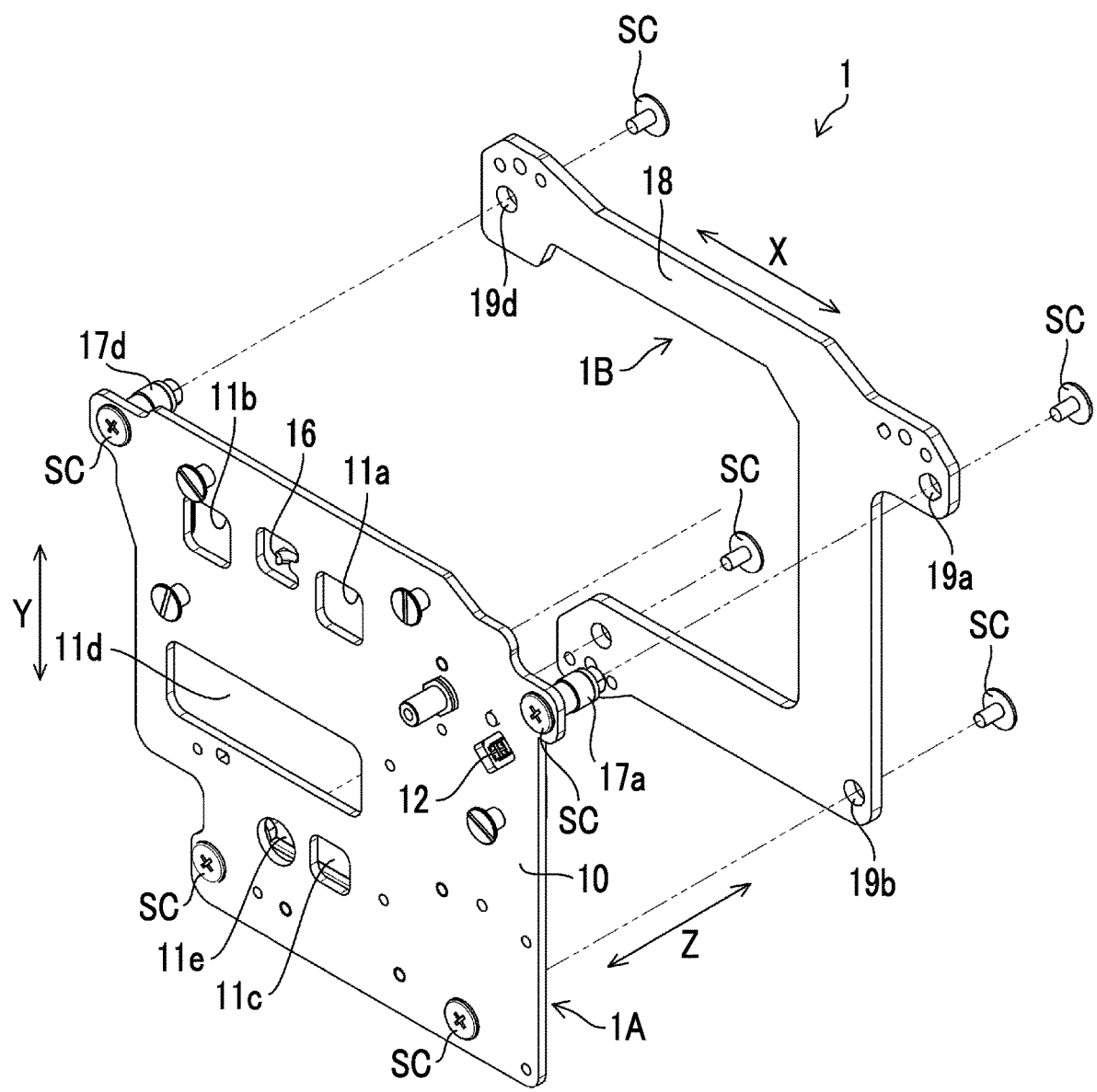
FIG. 5 is an exploded perspective view of the support member shown in FIG. 4 as seen from a side opposite to the imaging optical system side.

FIG. 5 is an exploded perspective view of the support member 1 shown in FIG. 4 as seen from a side opposite to the imaging optical system 103 side.

As shown in FIGS. 4 and 5, the first support member 1A includes a plate-shaped base 10 that is formed of resin or the like and that has a flat surface perpendicular to the direction Z and protrusion portions 17a, 17b, 17c, and 17d that extend in the direction Z toward the imaging optical system 103 side from an edge part of the base 10.

The second support member 1B includes the yoke 18 that has an approximately U-like shape as seen from the imaging optical system 103 side. In the yoke 18, hole portions 19a, 19b, 19c, and 19d are formed at positions facing the protrusion portions 17a, 17b, 17c, and 17d. The yoke 18 has an approximately U-like shape of which the right side in the direction X is open as seen from the imaging optical system 103 side.

In a state where the movable member 2 (not shown) is disposed between the first support member 1A and the second support member 1B, the protrusion portions 17a, 17b, 17c, and 17d of the first support member 1A are fixed via screws SC after being inserted into the hole portions 19a, 19b, 19c, and 19d of the second support member 1B, the hole portions 19a, 19b, 19c, and 19d facing the protrusion portions 17a, 17b, 17c, and 17d respectively. Accordingly, the movable member 2 enters a state of being supported by the support member 1.

As shown in FIG. 4, on a surface of the base 10 that is on the imaging optical system 103 side, a yoke 14 that has an approximately L-like shape as seen from the imaging optical system 103 side is disposed at an end portion on a left side in the direction X and an end portion on a lower side in the direction Y as seen from the imaging optical system 103 side.

To a surface of a portion of the yoke 14 of the first support member 1A that extends in the direction Y, the X axis-cum-rotary driving magnet Mv1 constituting a first driving magnet and the X axis-cum-rotary driving magnet Mv2 constituting a second driving magnet are fixed while being arranged at intervals in the direction Y.

As seen from the imaging optical system 103 side, the N pole of the X axis-cum-rotary driving magnet Mv1 is disposed to face a right side in the direction X and the S pole thereof is disposed to face a left side in the direction X.

As seen from the imaging optical system 103 side, the N pole of the X axis-cum-rotary driving magnet Mv2 is disposed to face a right side in the direction X and the S pole thereof is disposed to face a left side in the direction X.

To a surface of a portion of the yoke 14 of the first support member 1A that extends in the direction X, the Y axis driving magnet Mv3 constituting a third driving magnet is fixed.

As seen from the imaging optical system 103 side, the N pole of the Y axis driving magnet Mv3 is disposed to face an upper side in the direction Y and the S pole thereof is disposed to face a lower side in the direction Y.

The yoke 18 is disposed at a position to overlap with the X axis-cum-rotary driving magnet Mv1, the X axis-cum-rotary driving magnet Mv2, and the Y axis driving magnet Mv3 as seen from the imaging optical system 103 side so that magnetic flux leakage to the vicinity is prevented. The shape of the yoke 18 is not limited to the approximately U-like shape and may be an approximately L-like shape as long as the yoke 18 overlaps with the X axis-cum-rotary driving magnet Mv1, the X axis-cum-rotary driving magnet Mv2, and the Y axis driving magnet Mv3.

As shown in FIG. 5, the protrusion portions 17a, 17b, 17c, and 17d are fixed to the base 10 of the first support member 1A via the screws SC. On a surface of the base 10 that is on a side opposite to the imaging optical system 103 side, two reflective type photosensors 12 are disposed on the right side in the direction X while being on the upper side in the direction Y as seen from the side opposite to the imaging optical system 103 side, for the purpose of detection of the position of the movement restriction member 4 which will be described later. As shown in FIG. 4, three flat surfaces 15a, 15b, and 15c perpendicular to the direction Z are formed on the surface of the base 10 that is on the imaging optical system 103 side. All of the flat surfaces 15a, 15b, and 15c are at the same position in the direction Z and are formed on the same plane.

In the surface of the base 10 that is on the imaging optical system 103 side, a through-hole 11a for restriction of the movement of the movable member 2 and for passage of a sandwiching target member 26a (refer to FIGS. 6 and 7) is formed on the upper side in the direction Y while being on a side close to the X axis-cum-rotary driving magnet Mv1 as seen from the imaging optical system 103 side, a through-hole 11b for restriction of the movement of the movable member 2 and for passage of a sandwiching target member 26b (refer to FIGS. 6 and 7) is formed on the upper side in the direction Y while being on a side close to the protrusion portion 17d, and a through-hole 11c for restriction of the movement of the movable member 2 and for passage of an insertion member 28 (refer to FIG. 7) is formed on the upper side in the direction Y while being on a side close to the Y axis driving magnet Mv3.

A through-hole 11d through which a flexible print substrate 25 to be mounted on the movable member 2, which will be described later, passes is formed approximately at the center of the base 10. The through-hole 11d has a rectangular shape of which the length in the direction X is larger than the length thereof in the direction Y.

A hook 16, with which one end of a spring 24a (refer to FIGS. 8 and 9) is engaged, is formed between the through-hole 11a and the through-hole 11b while being on an upper side of the base 10 in the direction Y. A through-hole 11e, through which a spring 24b (refer to FIGS. 8 and 9) passes, is formed on a lower side of the base 10 in the direction Y while being formed above the Y axis driving magnet Mv3.

Figure 6:
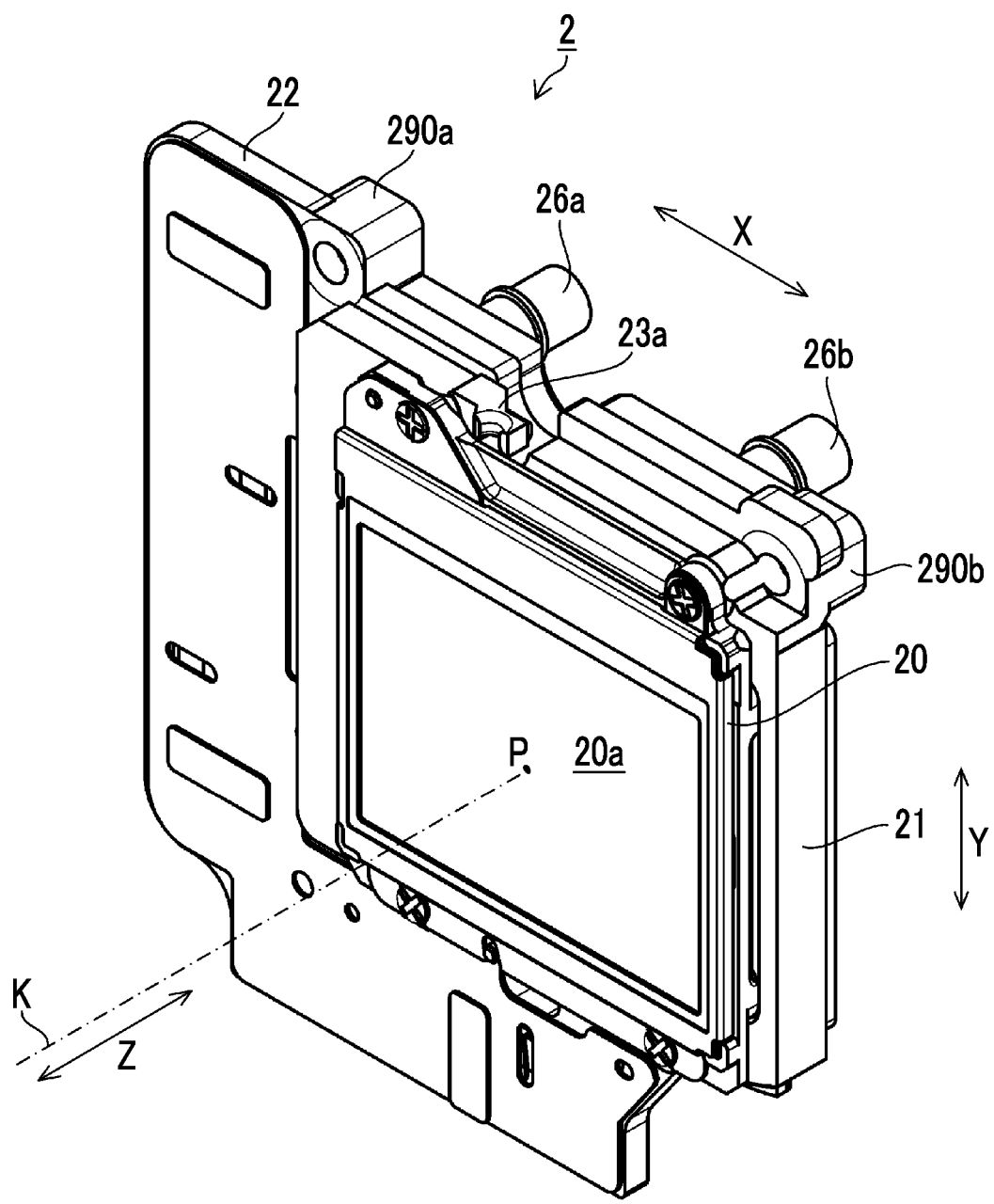
FIG. 6 is a perspective view of a movable member of the image shake correction device shown in FIG. 3 as seen from the imaging optical system side.

FIG. 6 is a perspective view of the movable member 2 of the image shake correction device 3 shown in FIG. 3 as seen from the imaging optical system 103 side.

Figure 7:
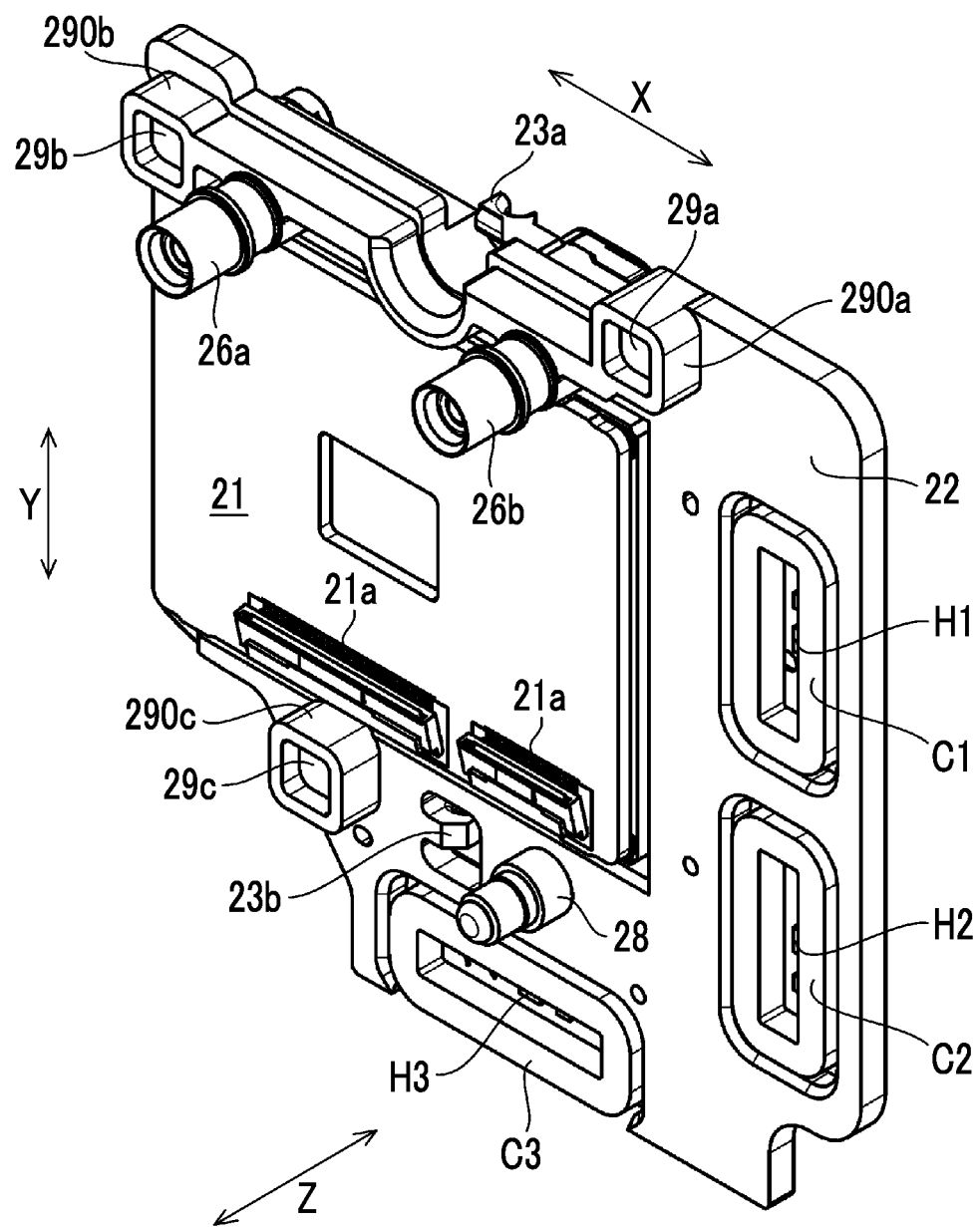
FIG. 7 is a perspective view of the movable member shown in FIG. 6 as seen from the side opposite to the imaging optical system side.

FIG. 7 is a perspective view of the movable member 2 shown in FIG. 6 as seen from the side opposite to the imaging optical system 103 side.

As shown in FIG. 7, the movable member 2 includes a base 22 that has an approximately rectangular shape surrounding the four sides of the circuit board 21 as seen from the imaging optical system 103 side, the base 22 being composed of a linear portion (also referred to as upper horizontal side portion) that extends in the direction X, a linear portion (also referred to as vertical side portion) that extends downward in the direction Y from a right end portion of the above-described portion in the direction X, a linear portion (also referred to as lower horizontal side portion) that extends leftward in the direction X from a lower end portion of the portion extending in the direction Y, and a vertical side portion that extends downward in the direction Y from a left end portion of the upper horizontal side portion in the direction X and is connected to a left end portion of the lower horizontal side portion. As shown in FIG. 7, a left side of the base 22 in the direction X is open in a case where the movable member 2 is seen from the side opposite to the imaging optical system 103 side.

As shown in FIGS. 6 and 7, the circuit board 21 with the imaging element 20 mounted thereon is fixed to the base 22 via an adhesive or the like at a region surrounded by four portions which are the upper horizontal side portion, the two vertical side portions, and the lower horizontal side portion.

In addition, as shown in FIG. 7, in the base 22, the X axis-cum-rotary driving coil C1 is disposed at a position facing the X axis-cum-rotary driving magnet Mv1 shown in FIG. 4.

In addition, in the base 22, the X axis-cum-rotary driving coil C2 is disposed at a position facing the X axis-cum-rotary driving magnet Mv2 shown in FIG. 4.

Furthermore, in the base 22, the Y axis driving coil C3 is disposed at a position facing the Y axis driving magnet Mv3 shown in FIG. 4.

The X axis-cum-rotary driving coil C1 shown in FIG. 7 and the X axis-cum-rotary driving magnet Mv1 shown in FIG. 4 constitute an X axis driving voice coil motor (VCM).

The X axis driving VCM causes a control current to flow to the X axis-cum-rotary driving coil C1 to move the movable member 2 in the direction X by means of Lorentz force between the X axis-cum-rotary driving coil C1 and the X axis-cum-rotary driving magnet Mv1.

The X axis-cum-rotary driving coil C2 shown in FIG. 7 and the X axis-cum-rotary driving magnet Mv2 shown in FIG. 4 constitute a VCM. The VCM and the X axis driving VCM described above constitute a rotary driving VCM.

The rotary driving VCM makes a direction in which a control current flows to the X axis-cum-rotary driving coil C1 shown in FIG. 7 and a direction in which a control current flows to the X axis-cum-rotary driving coil C2 shown in FIG. 7 opposite to each other so as to rotate the movable member 2 around the optical axis K with the center P of the light-receiving surface 20a as the center of the rotation by means of Lorentz force between the X axis-cum-rotary driving coil C1 and the X axis-cum-rotary driving magnet Mv1 and Lorentz force between the X axis-cum-rotary driving coil C2 and the X axis-cum-rotary driving magnet Mv2.

The Y axis driving coil C3 shown in FIG. 7 and the Y axis driving magnet Mv3 shown in FIG. 4 constitute a Y axis driving VCM.

The Y axis driving VCM causes a control current to flow to the Y axis driving coil C3 to move the movable member 2 in the direction Y by means of Lorentz force between the Y axis driving coil C3 and the Y axis driving magnet Mv3.

As shown in FIG. 7, the Hall element H1 is disposed at the center of the X axis-cum-rotary driving coil C1, the Hall element H2 is disposed at the center of the X axis-cum-rotary driving coil C2, and the Hall element H3 is disposed at the center of the Y axis driving coil C3. The Hall element H1 is fixed at a position facing an intermediate position between the S pole and the N pole of the X axis-cum-rotary driving magnet Mv1.

The Hall element H2 is fixed at a position facing an intermediate position between the S pole and the N pole of the X axis-cum-rotary driving magnet Mv2.

The Hall element H3 is fixed at a position facing an intermediate position between the S pole and the N pole of the Y axis driving magnet Mv3.

The Hall element H1 outputs a signal corresponding to a magnetic field generated by the X axis-cum-rotary driving magnet Mv1, and the system control unit 108 detects the position of the movable member 2 in the direction X by means of the output change of the signal.

The Hall element H2 outputs a signal corresponding to a magnetic field generated by the X axis-cum-rotary driving magnet Mv2, and the system control unit 108 detects the position of the movable member 2 in the direction X by means of the output change of the signal.

The Hall element H3 outputs a signal corresponding to a magnetic field generated by the Y axis driving magnet Mv3, and the system control unit 108 detects the position of the movable member 2 in the direction Y.

With a change of the output signal of the Hall element H1 and a change of the output signal of the Hall element H2, the system control unit 108 detects the angle of rotation of the movable member 2 around the optical axis K as the position of the movable member 2 in the direction θ.

As shown in FIGS. 6 and 7, a hook 23a is disposed at a position on the base 22 that faces the hook 16 (refer to FIG. 4) of the support member 1. The other end of the spring 24a (refer to FIGS. 8 and 9) is engaged with the hook 23a.

The movable member 2 is biased toward the first support member 1A by the spring 24a that is engaged with each of the hook 16 and the hook 23a.

As shown in FIGS. 6 and 7, a hook 23b is disposed at a position on the base 22 that faces the through-hole 11e (refer to FIG. 4) of the support member 1. The other end of the spring 24b (refer to FIGS. 8 and 9) is engaged with the hook 23b. Note that, one end of the spring 24b is engaged with a hook 435d (refer to FIG. 10) of a gearbox 435 constituting the movement restriction member 4, which will be described later.

The movable member 2 is biased toward the first support member 1A by the spring 24b that is engaged with each of the hook 435d and the hook 23b.

Although an example of each of the spring 24a and the spring 24b is a coil spring, a magnetic spring that uses an attractive force of a magnet or a combination of a coil spring and a magnetic spring may also be used as long as the movable member 2 can be biased toward the first support member 1A constituting the support member 1.

As shown in FIG. 7, at a position on the base 22 that faces the flat surface 15a of the first support member 1A shown in FIG. 4, a recess portion 290a that accommodates a rolling body (spherical ball) for making the movable member 2 movable within a plane perpendicular to the direction Z is disposed. A bottom surface 29a of the recess portion 290a is composed of a flat surface perpendicular to the direction Z.

In addition, at a position on the base 22 that faces the flat surface 15b of the first support member 1A shown in FIG. 4, a recess portion 290b that accommodates a rolling body for making the movable member 2 movable within a plane perpendicular to the direction Z is disposed. A bottom surface 29b of the recess portion 290b is composed of a flat surface perpendicular to the direction Z.

Furthermore, at a position on the base 22 that faces the flat surface 15c of the first support member 1A shown in FIG. 4, a recess portion 290c that accommodates a rolling body for making the movable member 2 movable within a plane perpendicular to the direction Z is disposed. A bottom surface 29c of the recess portion 290c is composed of a flat surface perpendicular to the direction Z.

All of the bottom surfaces 29a, 29b, and 29c are at the same position in the direction Z and are formed on the same plane. In the present example, the bottom surfaces 29a, 29b, and 29c are disposed on the same plane. However, the bottom surfaces 29a, 29b, and 29c do not need to be disposed on the same plane as long as the bottom surfaces 29a, 29b, and 29c are in a positional relationship of being parallel to each other.

As the rolling bodies, which are disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A, rotate, the movable member 2 moves within the plane perpendicular to the direction Z.

As shown in FIG. 7, two connectors 21a are disposed at an end portion that is on a lower side in the direction Y of a rear surface of the circuit board 21 fixed to the movable member 2.

The two connectors 21a include terminals connected to various terminals (power terminal which is terminal for power supply, ground terminal which is terminal for grounding, terminal for outputting signal, driving terminal, or like) of the imaging element 20 mounted on the circuit board 21.

The flexible print substrate 25 (not shown), which is a flexible substrate, is connected to each of the two connectors 21a. The terminals that the connectors 21a include and wiring lines that the flexible print substrate 25 include are electrically connected to each other.

Figure 8:
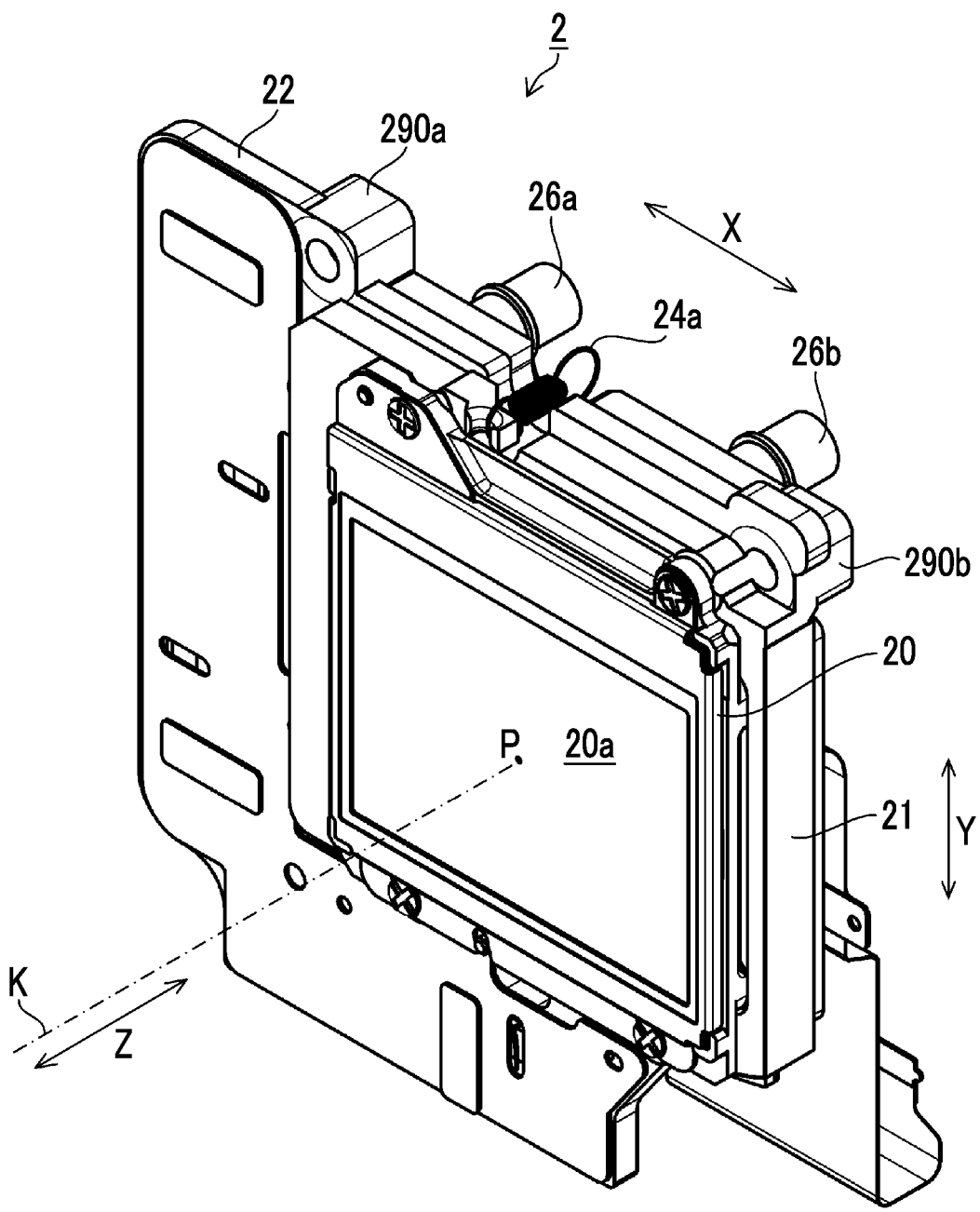
FIG. 8 is a perspective view of the movable member connected to a flexible print substrate as seen from the imaging optical system side.

FIG. 8 is a perspective view of the movable member 2 connected to the flexible print substrate 25 as seen from the imaging optical system 103 side.

Figure 9:
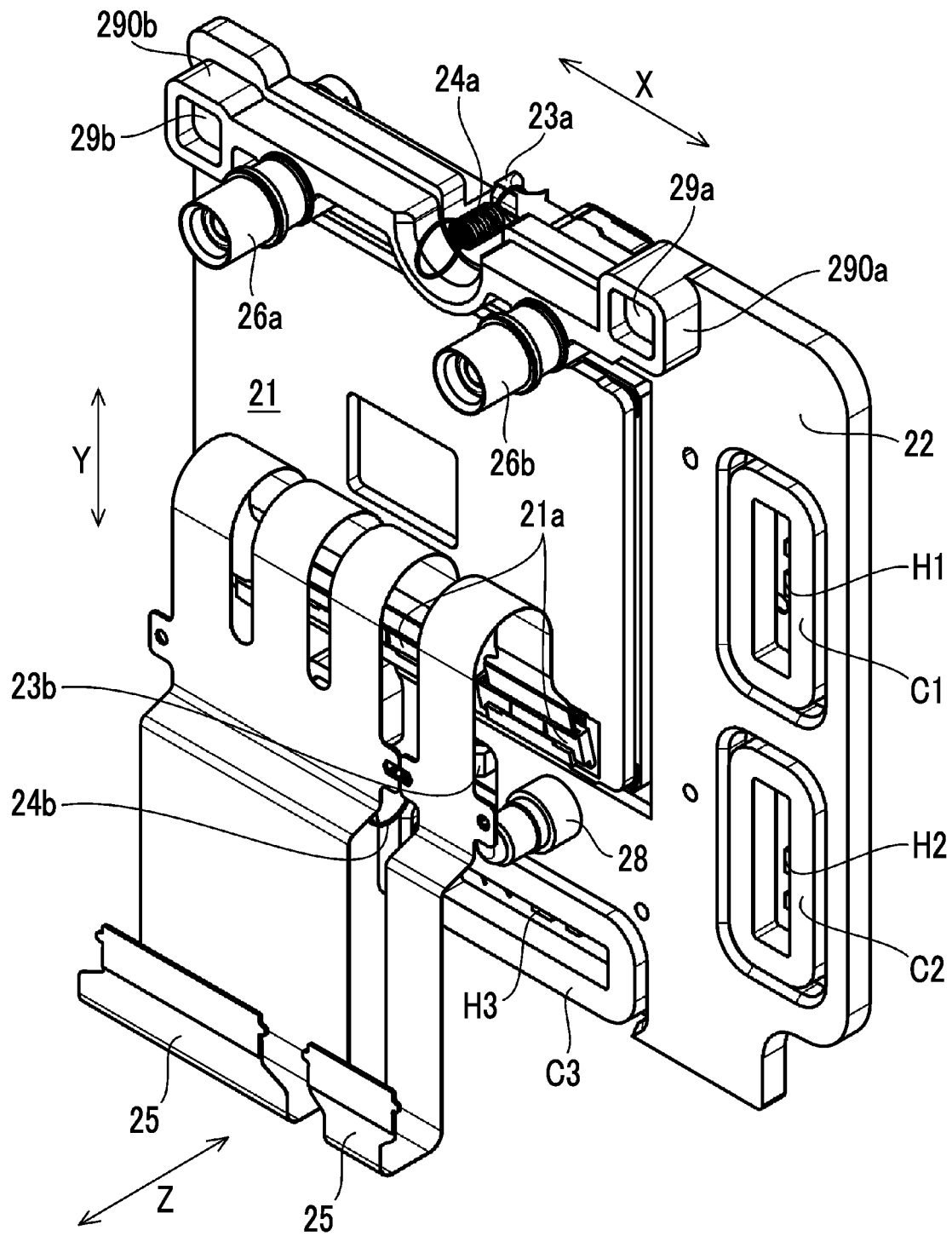
FIG. 9 is a perspective view of the movable member connected to the flexible print substrate shown in FIG. 8 as seen from the side opposite to the imaging optical system side.

FIG. 9 is a perspective view of the movable member 2 connected to the flexible print substrate 25 shown in FIG. 8 as seen from the side opposite to the imaging optical system 103 side.

As shown in FIGS. 8 and 9, the flexible print substrate 25 is connected to the movable member 2. As shown in FIG. 9, the flexible print substrate 25 is connected to the connectors 21a at one end thereof. The flexible print substrate 25 extends upward in the direction Y from the connectors 21a, and is folded downward in the direction Y at an intermediate portion. The flexible print substrate 25 extends to the lower horizontal side portion of the base 22 and is folded upward in the direction Y at an intermediate portion. Both end portions of the flexible print substrate 25 include terminals. One of the terminals is electrically connected to the connectors 21a, and the other of the terminals is connected to a connector of a main board (board on which system control unit 108 or like is formed) (not shown).

As shown in FIGS. 6 to 9, the sandwiching target members 26a and 26b that protrude toward the first support member 1A side in the direction Z are fixed to a surface of the base 22 that is on the first support member 1A side, the base 22 constituting the movable member 2. Above the circuit board 21 in the direction Y, the sandwiching target members 26a and 26b are disposed at the upper horizontal side portion of the base 22 such that the sandwiching target members 26a and 26b are arranged at an interval in the direction X. The sandwiching target members 26a and 26b are at approximately the same positions in the direction Y and the direction Z. The movement of the movable member 2 is restricted as the movement restriction member 4, which will be described later, mechanically sandwiches the sandwiching target members 26a and 26b. Longitudinal directions of the sandwiching target members 26a and 26b are preferably parallel to the optical axis K. Note that, in a case where the sandwiching target members 26a and 26b do not need to be distinguished from each other, the sandwiching target members 26a and 26b may be referred to as the sandwiching target members 26.

The sandwiching target member 26a is inserted into the through-hole 11a of the first support member 1A shown in FIG. 4. The sandwiching target member 26b is inserted into the through-hole 11b of the first support member 1A shown in FIG. 4.

As shown in FIGS. 7 and 9, the insertion member 28 that protrudes toward the first support member 1A side in the direction Z is fixed to a surface of the base 22 that is on the first support member 1A side. The insertion member 28 is arranged below the circuit board 21 and above the Y axis driving coil C3 in the direction Y. The insertion member 28 is inserted into the through-hole 11c of the first support member 1A shown in FIG. 4.

Figure 10:
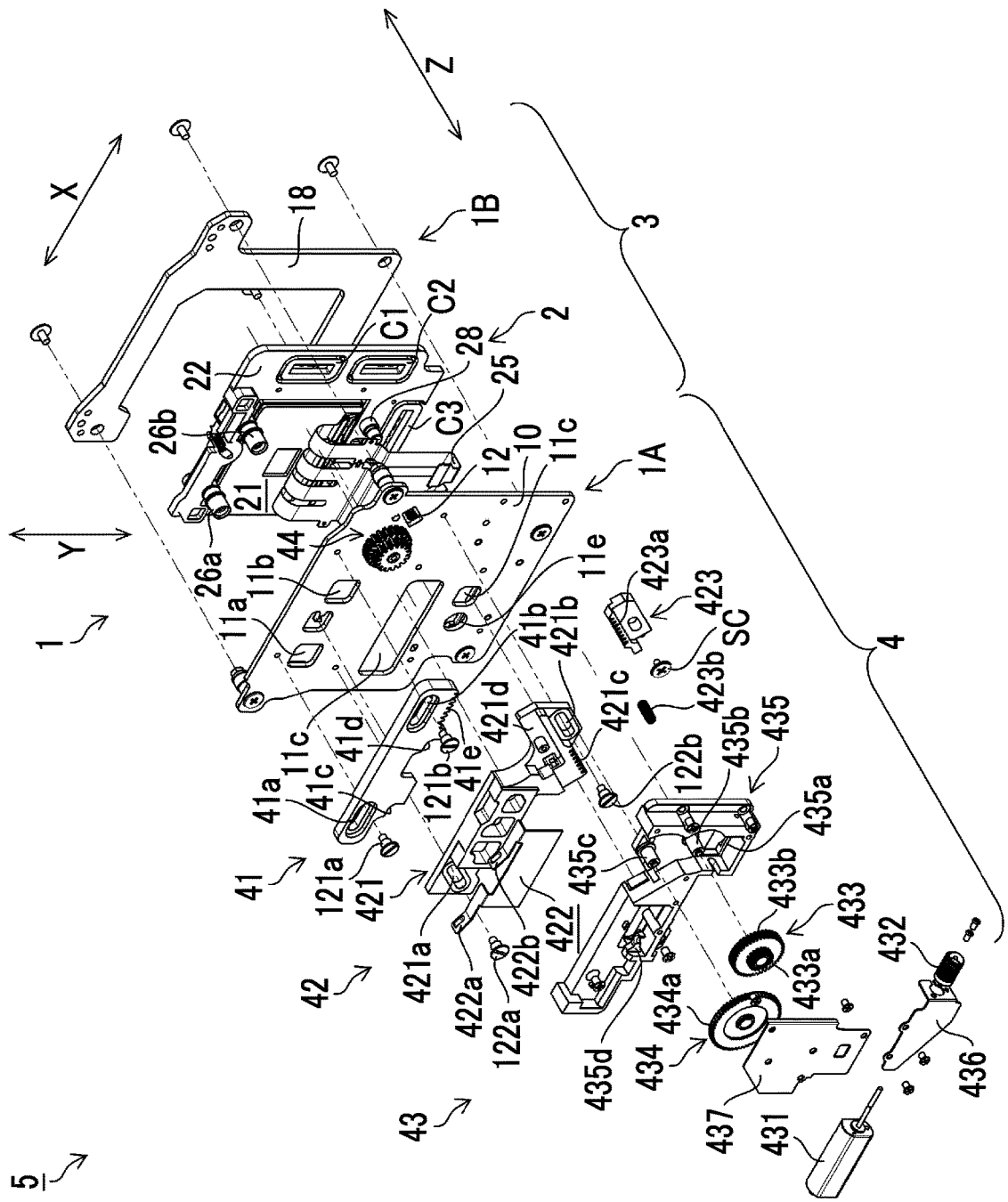
FIG. 10 is an exploded perspective view of the imaging unit as seen from the side opposite to the imaging optical system side.
Figure 11:
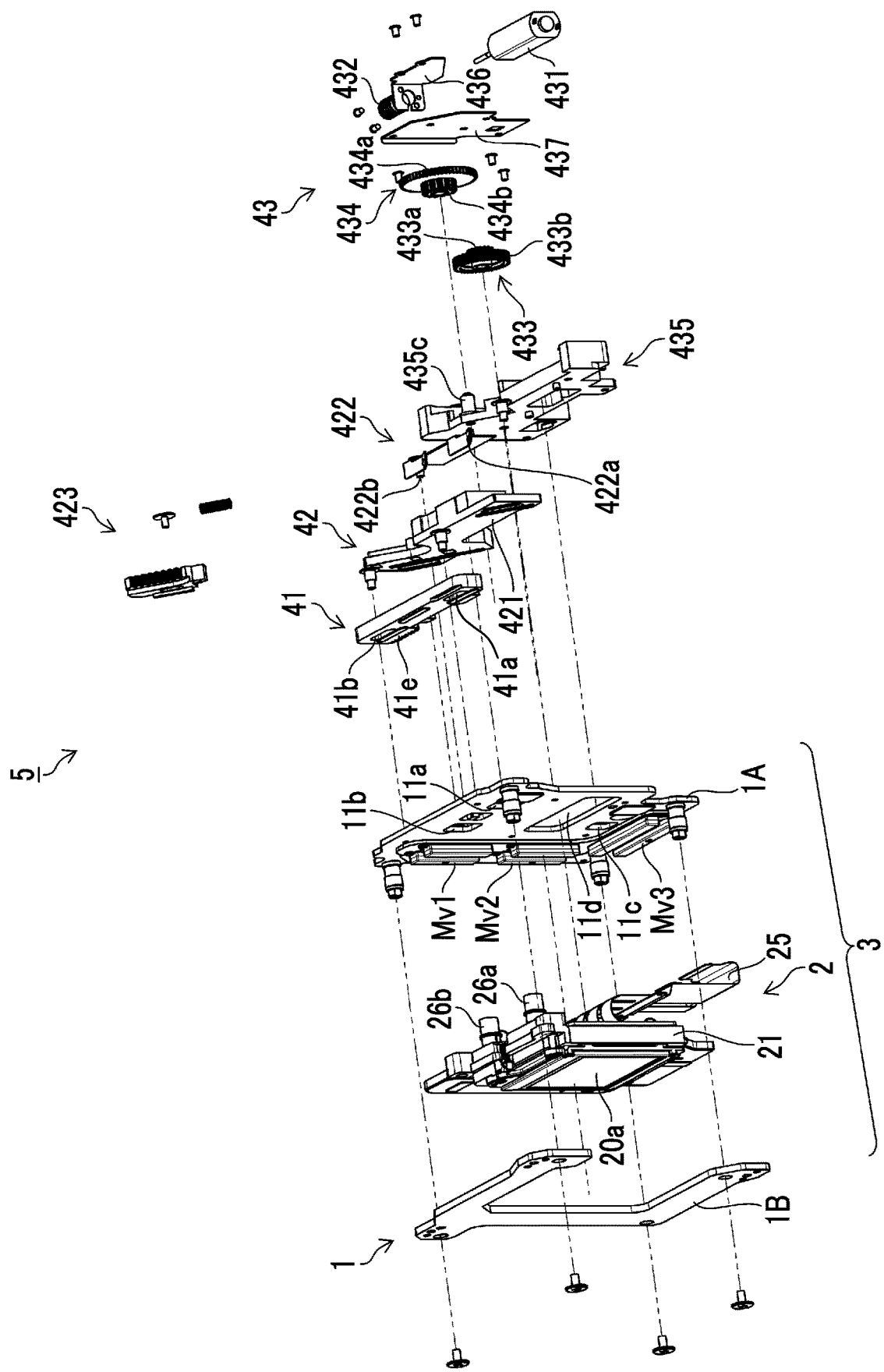
FIG. 11 is an exploded perspective view of the imaging unit as seen from the imaging optical system side.

Next, the configuration of the movement restriction member 4 will be described. FIG. 10 is an exploded perspective view of the imaging unit 5 as seen from the side opposite to the imaging optical system 103 side. FIG. 11 is an exploded perspective view of the imaging unit 5 as seen from the imaging optical system 103 side.

The movement restriction member 4 includes a first member 41, a second member 42, a gear unit 43, and an idler gear 44.

<Gear Unit>

The gear unit 43 includes a motor 431 of which a rotary shaft extends in the direction X, a worm gear 432 attached to the rotary shaft of the motor 431, a worm wheel 433 that meshes with the worm gear 432, a reduction gear 434 that meshes with the worm wheel 433, and a gearbox 435 that holds the motor 431, the worm gear 432, the worm wheel 433, and the reduction gear 434.

The worm wheel 433 is composed of a first wheel 433a and a second wheel 433b. The diameter of the second wheel 433b is larger than the diameter of the first wheel 433a. The second wheel 433b, which has a large diameter, meshes with the worm gear 432.

The reduction gear 434 is composed of a first gear 434a and a second gear 434b. (Refer to FIG. 11) The diameter of the first gear 434a is larger than the diameter of the second gear 434b. The first gear 434a of the reduction gear 434 and the first wheel 433a of the worm wheel 433 mesh with each other.

The gearbox 435 includes an accommodation portion 435a for accommodation of the worm gear 432, the worm wheel 433, and the reduction gear 434. A first shaft 435b that rotatably supports the worm wheel 433 and a second shaft 435c that rotatably supports the reduction gear 434 are disposed in the accommodation portion 435a. The gearbox 435 includes the hook 435d with which one end of the spring 24b described above is engaged.

The gear unit 43 further includes a motor cover 436 that covers the motor 431 and a gear cover 437 that covers the accommodation portion 435a of the gearbox 435.

<First Member>

The first member 41 is composed of a member extending in the direction X as a whole. The first member 41 is preferably formed of metal. The first member 41 includes two long holes 41a and 41b. The two long holes 41a and 41b penetrate the first member 41 and extend in the direction X. A shaft 121a provided for the first support member 1A of the support member 1 is inserted into the long hole 41a and a shaft 121b provided for the first support member 1A of the support member 1 is inserted into the long hole 41b. The shaft 121a and the shaft 121b are fixed to the first support member 1A.

The first member 41 includes a claw portion 41c that comes into contact with the sandwiching target member 26a and a claw portion 41d that comes into contact with the sandwiching target member 26b, the claw portions being on the lower side in the direction Y. The first member 41 is provided with a rack gear 41e that meshes with the idler gear 44, the rack gear being provided on the lower side in the direction Y with respect to the long hole 41b. The rack gear 41e extends in the direction X.

The direction of movement of the first member 41 is limited to a direction along the direction X by a pair formed by the long hole 41a and the shaft 121a and a pair formed by the long hole 41b and the shaft 121b. The shaft 121a functions as a guide shaft with respect to the long hole 41a, and the shaft 121b functions as a guide shaft with respect to the long hole 41b.

<Second Member>

As with the first member 41, the second member 42 includes a body portion 421 extending in the direction X as a whole. The body portion 421 includes two long holes 421a and 421b. The long holes 421a and 421b penetrate the body portion 421 and extend in an oblique direction from a lower left side to an upper right side as seen from the side opposite to the side of the imaging optical system 103 side. A shaft 122a provided for the first support member 1A of the support member 1 is inserted into the long hole 421a and a shaft 122b provided for the first support member 1A of the support member 1 is inserted into the long hole 421b. The shaft 122a and the shaft 122b are fixed to the first support member 1A. The body portion 421 is provided with a rack gear 421c that extends to be approximately parallel to the long hole 421b, the rack gear being provided below the long hole 421b in the direction Y. The rack gear 421c meshes with the second gear 434b of the reduction gear 434.

For example, a bent plate-shaped elastic member 422 is attached to a lower side of the body portion 421 in the direction Y. The elastic member 422 includes a claw portion 422a that comes into contact with the sandwiching target member 26a and a claw portion 422b that comes into contact with the sandwiching target member 26b.

The body portion 421 has an accommodation portion 421d adjacent to a left side of the long hole 421b in the direction X and the accommodation portion 421d accommodates a charge member 423. The charge member 423 includes an elastic member 423b and a rack gear 423a that meshes with the idler gear 44. In a case where the elastic member 423b is accommodated in the accommodation portion 421d, the elastic member 423b biases the rack gear 423a in an oblique rightward and upward direction. The rack gear 423a is movably fixed to the accommodation portion 421d by the screw SC.

The direction of movement of the second member 42 is limited to a direction along the oblique direction from the lower left side to the upper right side by a pair formed by the long hole 421a and the shaft 122a and a pair formed by the long hole 421b and the shaft 122b. The shaft 121a functions as a guide shaft with respect to the long hole 41a, the shaft 121a functions as a guide shaft with respect to the long hole 41a, and the shaft 121b functions as a guide shaft with respect to the long hole 41b.

<Idler Gear>

The idler gear 44 is composed of a first gear 44a and a second gear 44b. The diameter of the first gear 44a is smaller than the diameter of the second gear 44b (refer to FIGS. 12 and 13). The first gear 44a and the rack gear 423a of the second member 42 mesh with each other, and the second gear 44b and the rack gear 41e of the first member 41 mesh with each other. With the gears meshing with each other, the idler gear 44 transmits, to the first member 41, a driving force transmitted from the motor 431 which is a driving source to the second member 42. It is possible to change the transmission force by making the number of teeth of the first gear 44a different from the number of teeth of the second gear 44b.

<Operation of Movement Restriction Member>

Next, the operation of the movement restriction member 4 will be described. FIG. 12 is a plan view for describing the operation of the movement restriction member 4 in which the imaging unit 5 is seen from the side opposite to the imaging optical system 103 side. FIG. 12 shows a state where the first member 41 and the second member 42 are at non-sandwiching positions separated from the sandwiching target members 26a and 26b provided on the movable member 2.

1200A is a view showing the entire imaging unit 5, and 1200B is a partially enlarged view of the imaging unit 5. As shown in FIG. 12, the sandwiching target member 26a of the movable member 2 is inserted into the through-hole 11a of the first support member 1A, and the sandwiching target member 26a protrudes toward the side opposite to the imaging optical system 103 side. In addition, the sandwiching target member 26b of the movable member 2 is inserted into the through-hole 11b of the first support member 1A, and the sandwiching target member 26a protrudes toward the side opposite to the imaging optical system 103 side.

The first member 41 and the second member 42 are positioned at non-sandwiching positions separated from the sandwiching target members 26a and 26b. The claw portion 41c of the first member 41 and the sandwiching target member 26a are separated from each other, and the claw portion 41d of the first member 41 and the sandwiching target member 26b are separated from each other. Similarly, the claw portion 422a of the second member 42 and the sandwiching target member 26a are separated from each other, and the claw portion 422b of the second member 42 and the sandwiching target member 26b are separated from each other. As shown in FIG. 12, the first member 41 is positioned at a position PA1, which is the non-sandwiching position. Similarly, the second member 42 is positioned at a position PB1, which is the non-sandwiching position.

In a case where the first member 41 is positioned at the position PA1 which is the non-sandwiching position separated from the sandwiching target member 26a and the second member 42 is positioned at the position PB1 which is the non-sandwiching position separated from the sandwiching target member 26b, movement of the movable member 2 for image shake correction is allowed.

As shown in FIG. 12, the sandwiching target member 26a of the movable member 2 is inserted into the through-hole 11a of the first support member 1A, the sandwiching target member 26b of the movable member 2 is inserted into the through-hole 11b of the first support member 1A, and the insertion member 28 of the movable member 2 is inserted into the through-hole 11c of the first support member 1A. The range of movement of the sandwiching target member 26a is limited to the inside of the through-hole 11a, the range of movement of the sandwiching target member 26b is limited to the inside of the through-hole 11b, and the range of movement of the insertion member 28 is limited to the inside of the through-hole 11c. As described above, the range of movement of the movable member 2 (range of movement in direction X, range of movement in direction Y, and range of movement in direction θ) is limited to a predetermined range by a pair formed by the sandwiching target member 26a and the through-hole 11a, a pair formed by the sandwiching target member 26b and the through-hole 11b, and a pair formed by the insertion member 28 and the through-hole 11c.

As described above, the worm gear 432 attached to the rotary shaft of the motor 431 and the worm wheel 433 mesh with each other. The worm wheel 433 and the reduction gear 434 mesh with each other. The reduction gear 434 and the rack gear 421c (not shown) of the second member 42 mesh with each other. The rack gear 423a of the second member 42 and the idler gear 44 mesh with each other. The idler gear 44 and the rack gear 41e of the first member 41 mesh with each other. The motor 431, the first member 41, and the second member 42 are mechanically connected to each other via the worm gear 432 and the like to form a driving force transmission path of which a driving source is the motor 431.

FIG. 13 is a plan view for describing the operation of the movement restriction member 4 in which the imaging unit 5 is seen from the side opposite to the imaging optical system 103 side. FIG. 13 shows a state where the first member 41 and the second member 42 are at sandwiching positions at which the first member 41 and the second member 42 sandwich the sandwiching target members 26a and 26b provided on the movable member 2.

In a case where the motor 431 is driven, the worm gear 432 rotates around a rotation axis. The worm wheel 433 meshing with the worm gear 432 rotates. Accordingly, a driving force is transmitted to the worm wheel 433 of which a rotation axis is orthogonal to the rotation axis of the worm gear 432. Next, the driving force is transmitted to the reduction gear 434 that meshes with the worm wheel 433, and a driving force in a rotation direction is transmitted to the rack gear 421c of the second member 42 that meshes with the reduction gear 434. Accordingly, the driving force in the rotation direction of the reduction gear 434 is converted into a driving force in a linear direction.

The converted driving force in the linear direction moves the second member 42 within a plane intersecting the optical axis K (not shown). The direction of movement of the second member 42 is limited by a pair formed by the long hole 421a and the shaft 122a and a pair formed by the long hole 421b and the shaft 122b and thus the second member 42 moves in the direction along the oblique direction from the lower left side to the upper right side.

The driving force transmitted from the reduction gear 434 is transmitted to the idler gear 44 that meshes with the rack gear 423a of the second member 42. Accordingly, the driving force in the linear direction is converted into a driving force in a rotation direction.

The driving force in the rotation direction is transmitted to the rack gear 41e of the first member 41 that meshes with the idler gear 44. Accordingly, the driving force in the rotation direction of the idler gear 44 is converted into a driving force in a linear direction. The converted driving force in the linear direction moves the first member 41 within a plane intersecting the optical axis K (not shown). The direction of movement of the first member 41 is limited by a pair formed by the long hole 41a and the shaft 121a and a pair formed by the long hole 41b and the shaft 121b and thus the first member 41 moves in the direction along the direction X.

The first member 41 moves from the position PA1 which is the non-sandwiching position to a position PA2 which is the sandwiching position, the second member 42 moves from the position PB1 which is the non-sandwiching position to a position PB2 which is the sandwiching position, and the first member 41 and the second member 42 mechanically sandwich the sandwiching target members 26a and 26b. Since the sandwiching target members 26a and 26b are sandwiched, movement of the movable member 2 to which the sandwiching target members 26a and 26b are fixed is restricted.

The movable member 2 of the image shake correction device 3 has three degrees of freedom corresponding to translation in the direction X and the direction Y and rotation around the optical axis K. The two sandwiching target members 26a and 26b that are sandwiched by the first member 41 and the second member 42 are preferably separated from each other so that the rotation around the optical axis K is restricted. With the first member 41 and the second member 42 sandwiching the two sandwiching target members 26a and 26b, the degree of freedom of the movable member 2 becomes zero. The movement restriction member 4 including the first member 41 and the second member 42 fixes the relative position of the movable member 2 with respect to the support member 1.

Note that, in a case where the movable member 2 is to be released to be movable, the motor 431 is rotated in a reverse direction so that a direction in which a driving force is transmitted is reversed, the first member 41 moves from the position PA2 which is the sandwiching position to the position PA1 which is the non-sandwiching position, and the second member 42 moves from the position PB2 which is the sandwiching position to the position PB1 which is the non-sandwiching position. Therefore, it is possible to determine whether to restrict the movement of the movable member 2 by means of the movement restriction member 4 by switching between a forward rotation and a reverse rotation of the motor 431.

In the embodiment, a case where the first member 41 and the second member 42 are moved by one motor 431 has been used as an example. However, the first member 41 and the second member 42 may be moved by different actuators, respectively.

Note that, since the driving force transmission path is provided with the worm gear 432, the positions of the first member 41 and the second member 42 can be maintained by a frictional force of the worm gear 432 even in a case where the motor 431 is turned off (OFF).

As shown in FIG. 13, within the plane intersecting the optical axis K, the first member 41 moves between the position PA1 (non-sandwiching position) and the position PA2 (sandwiching position) and the second member 42 moves between the position PB1 (non-sandwiching position) and the position PB2 (sandwiching position), the first member 41 and the second member 42 moving in different directions.

In the embodiment, the movable member 2 is provided with the two sandwiching target members 26a and 26b, and the movement restriction member 4 is provided with the first member 41 and the second member 42 that move within the plane intersecting the optical axis K. The position of the movable member 2 is fixed in a case where the two sandwiching target members 26a and 26b are sandwiched in different directions by the claw portions 41c and 41d of the first member 41 and the claw portion 422a and the claw portion 422b of the second member 42.

In addition, since the first member 41 is provided with the two claw portions 41c and 41d and the second member 42 is provided with the two claw portions 422a and 422b, the number of actuators required to sandwich the two sandwiching target members 26a and 26b can be reduced.

For example, the first member 41 may be configured as two members including the claw portion 41c and the claw portion 41d respectively, and the two members may be driven independently of each other. Similarly, the second member 42 may be configured as two members including the claw portion 422a and the claw portion 422b respectively, and the two members may be driven independently of each other.

In the embodiment, the claw portion 41c and the claw portion 41d of the first member 41 are formed by processing the first member 41 or the like and have stiffness. Each of the claw portion 41c and the claw portion 41d is formed in an arc shape of which the diameter is smaller than the diameter of the sandwiching target members 26a and 26b, the claw portion 41c and the sandwiching target member 26a come into contact with each other at two points and the claw portion 41d and the sandwiching target member 26b come into contact with each other at two points.

Meanwhile, the claw portion 422a and the claw portion 422b of the second member 42 are formed by processing a plate-shaped member and are configured as elastic members similar to leaf springs. In a case where the sandwiching target member 26a is sandwiched by the claw portion 41c and the claw portion 422a, the claw portion 422a can bias the sandwiching target member 26a toward the claw portion 41c. The sandwiching target member 26a can be stably held by the claw portion 41c and the claw portion 422a. Note that, the elastic members are not limited to leaf springs or the like. Similarly, the claw portion 422b biases the sandwiching target member 26b toward the claw portion 41d, the sandwiching target member 26b can be stably held by the claw portion 41d and the claw portion 422b. The claw portion 422a and the sandwiching target member 26a come into contact with each other at one point, and the claw portion 422b and the sandwiching target member 26b come into contact with each other at one point.

The claw portion 41c of the first member 41 and the claw portion 422a of the second member 42 sandwich the sandwiching target member 26a at three points. A triangle connecting the three points is an acute-angled triangle. In addition, the claw portion 41d of the first member 41 and the claw portion 422b of the second member 42 sandwich the sandwiching target member 26b at three points. A triangle connecting the three points is an acute-angled triangle. Since each sandwiching target member is sandwiched at three points and a triangle connecting the three points is an acute-angled triangle, each sandwiching target member can be stably sandwiched. In the embodiment, the first member 41 and the second member 42 sandwich the sandwiching target members 26a and 26b at at least two or more points.

Two reflective type photosensors 12 are disposed on the base 10 of the first support member 1A (refer to FIG. 5). The reflective type photosensors 12 are disposed at positions facing the body portion 421 of the second member 42. The two reflective type photosensors 12 output different signals depending on the position of the body portion 421. The two reflective type photosensors 12 can detect the position of the body portion 421 in a case where the second member 42 is positioned at the non-sandwiching position and can detect the position of the body portion 421 in a case where the second member 42 is positioned at the sandwiching position. The body portion 421 is mirror-attached at a position facing the reflective type photosensors 12 and reflects light at a position overlapping the reflective type photosensors 12 so that the position of the body portion 421 is detected.

Figure 14:
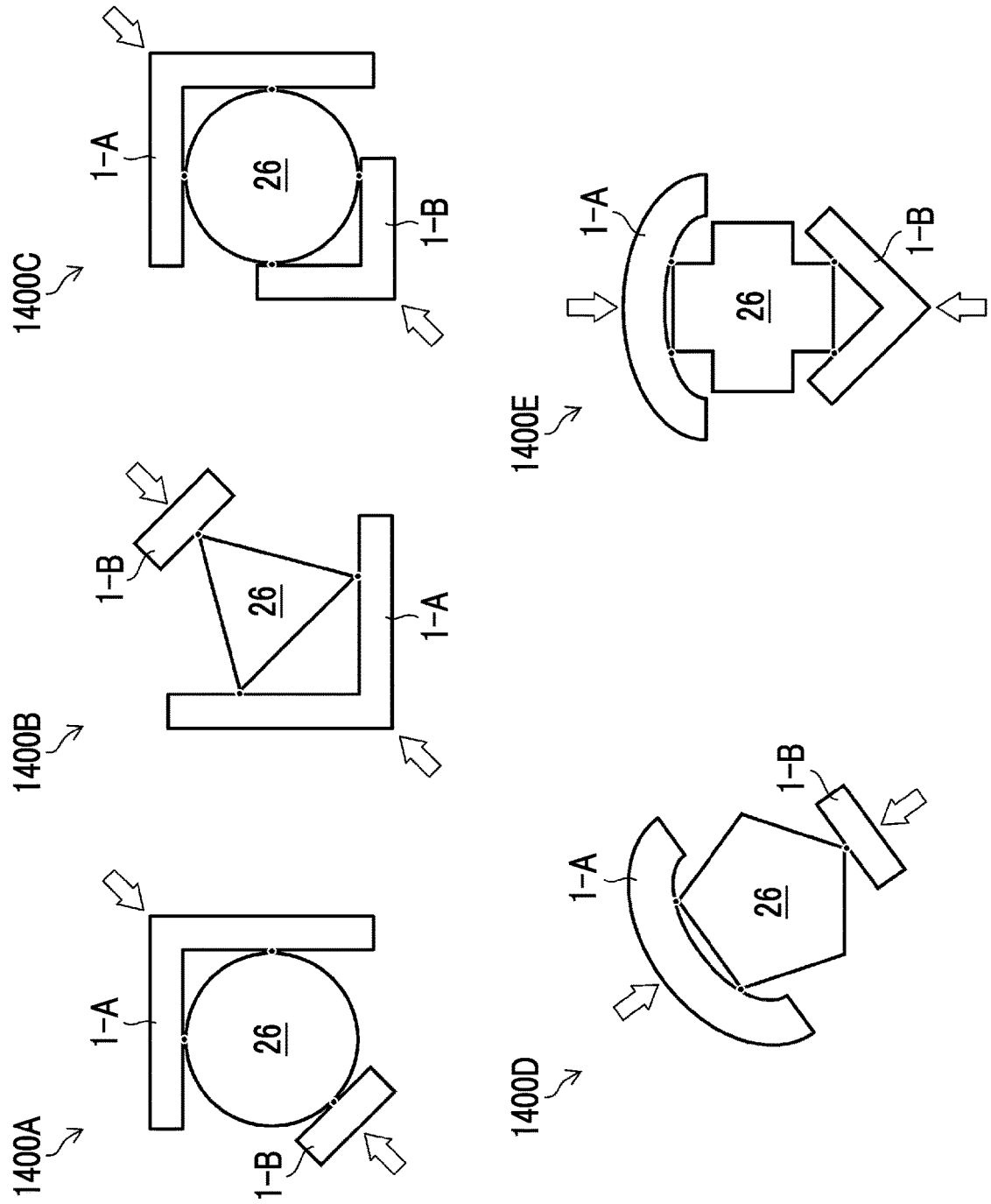
FIG. 14 is an enlarged view of a sandwiching target member, a claw portion of a first member, and a claw portion of a second member.

Next, preferable shapes of a claw portion (here, claw portion 1-A) provided on the first member 41 and a claw portion (here, claw portion 1-B) provided on the second member 42 will be described. FIG. 14 is an enlarged view of the sandwiching target member 26, the claw portion 1-A, and the claw portion 1-B.

In FIG. 14, the claw portion 1-A of the first member 41 and the claw portion 1-B of the second member 42 sandwich the sandwiching target member 26 at three or more points.

In 1400A, the sandwiching target member 26 has a cylindrical shape as seen in a cross section. The claw portion 1-A of the first member 41 has an L-shape and comes into contact with the sandwiching target member 26 at two points. The claw portion 1-B of the second member 42 has a rectangular shape and comes into contact with the sandwiching target member 26 at one point. The claw portion 1-A of the first member 41 and the claw portion 1-B of the second member 42 sandwich the sandwiching target member 26 at three points. A triangle connecting the three points is an acute-angled triangle.

In 1400B, the sandwiching target member 26 has a triangular shape as seen in a cross section. The claw portion 1-A of the first member 41 has an L-shape and comes into contact with the sandwiching target member 26 at two points. The claw portion 1-B of the second member 42 has a rectangular shape and comes into contact with the sandwiching target member 26 at one point. The claw portion 1-A of the first member 41 and the claw portion 1-B of the second member 42 sandwich the sandwiching target member 26 at three points. A triangle connecting the three points is an acute-angled triangle.

In 1400C, the sandwiching target member 26 has a cylindrical shape as seen in a cross section. The claw portion 1-A of the first member 41 has an L-shape and comes into contact with the sandwiching target member 26 at two points. The claw portion 1-B of the second member 42 has an L-shape and comes into contact with the sandwiching target member 26 at two points. The claw portion 1-A of the first member 41 and the claw portion 1-B of the second member 42 sandwich the sandwiching target member 26 at four points.

In 1400D, the sandwiching target member 26 has a pentagonal shape as seen in a cross section. The claw portion 1-A of the first member 41 has an arc shape and comes into contact with the sandwiching target member 26 at two points. The claw portion 1-B of the second member 42 has a rectangular shape and comes into contact with the sandwiching target member 26 at two points. The claw portion 1-A of the first member 41 and the claw portion 1-B of the second member 42 sandwich the sandwiching target member 26 at three points. A triangle connecting the three points is an acute-angled triangle.

In the 1400E, the sandwiching target member 26 has a cross shape as seen in a cross section. The claw portion 1-A of the first member 41 has an arc shape and comes into contact with the sandwiching target member 26 at two points. The claw portion 1-B of the second member 42 has an L-shape and comes into contact with the sandwiching target member 26 at two points. The claw portion 1-A of the first member 41 and the claw portion 1-B of the second member 42 sandwich the sandwiching target member 26 at four points.

The shapes of the cross sections of the claw portion 1-A of the first member 41, the claw portion 1-B of the second member 42, and the sandwiching target member 26 are not particularly limited. The sandwiching target member 26 can be stably held in a case where the claw portion 1-A of the first member 41 and the claw portion 1-B of the second member 42 sandwich the sandwiching target member 26 at three points. Particularly, in a case where a triangle connecting the three points is an acute-angled triangle, the sandwiching target member 26 can be more stably sandwiched.

Next, in a case where an image is to be captured by the digital camera 100 in a state where the movement of the movable member 2 is restricted by the movement restriction member 4, it is preferable that the optical axis K of the imaging element 20 of the movable member 2 and the optical axis OA of the imaging optical system 103 coincide with each other. For the above-described purpose, it is preferable to improve the reproducibility of the sandwiching positions at which the first member 41 and the second member 42 sandwich the sandwiching target members 26a and 26b.

As described above, in a case where the second member 42 is moved from the position PB1 (non-sandwiching position) to the position PB2 (sandwiching position) by the driving force of the motor 431, the first member 41 is moved from the position PA1 (non-sandwiching position) to the position PA2 (sandwiching position) via the idler gear 44. At this time, it is preferable that the first member 41 reaches the position PA2 (sandwiching position) before the second member 42 reaches the position PB2 (sandwiching position) in a case where the first member 41 is moved from the position PA1 (non-sandwiching position) to the position PA2 (sandwiching position).

Since the first member 41 reaches the position PA2 (sandwiching position) for sandwiching the sandwiching target members 26a and 26b and the second member 42 reaches the position PB2 (sandwiching position) for sandwiching the sandwiching target members 26a and 26b, the procedure for sandwiching the sandwiching target members 26a and 26b can be made constant and the reproducibility of the sandwiching positions can be improved.

In order to make the procedure for sandwiching the sandwiching target members 26a and 26b constant, it is preferable to make the first member 41 and the second member 42 different from each other in distance of movement between the sandwiching position and the non-sandwiching position (distance between position PA1 and position PA2 and distance between position PB1 and position PB2) and/or to make the first member and the second member different from each other in speed of movement between the sandwiching position and the non-sandwiching position.

Figure 15:
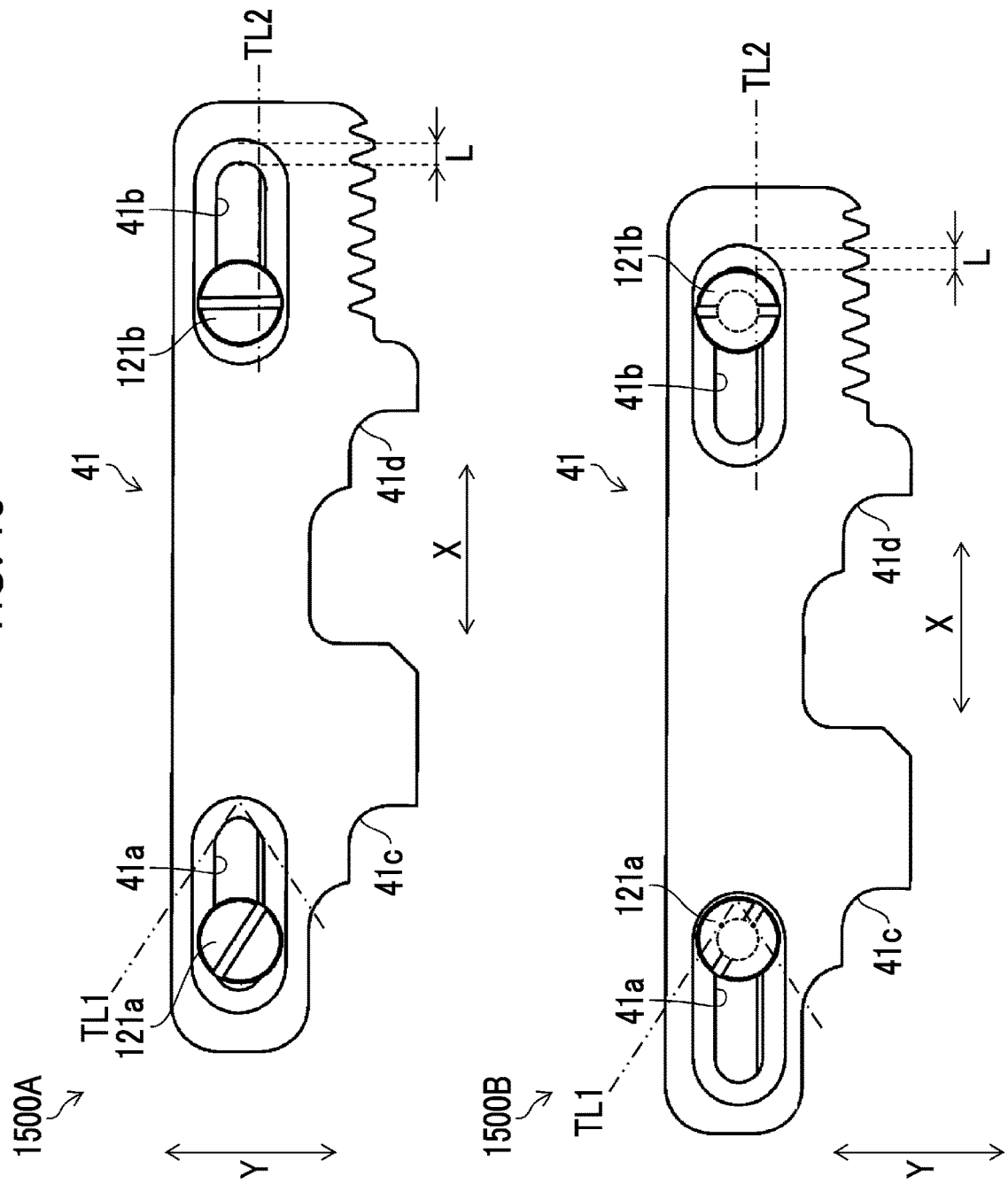
FIG. 15 is an enlarged view of the first member.

FIG. 15 is an enlarged view of the first member 41. 1500A shows a state where the first member 41 is at the non-sandwiching position, and 1500B shows a state where the first member 41 is at the sandwiching position. As described above, the first member 41 includes the long hole 41a and the long hole 41b. In the embodiment shown in FIG. 15, the shapes of the long hole 41a and the long hole 41b are different from each other.

As shown in 1500A, the shape of a right end portion of the long hole 41a is a V-shape as shown by tangent lines TL1 to the hole shape. The right end portion of the long hole 41a is a region that comes into contact with the shaft 121a in a case where the first member 41 moves to the sandwiching position. As shown in 1500B, the shaft 121a and the long hole 41a come into contact with each other at two points. Since the contact is made at two points, the position of the first member 41 in the direction X can be fixed. The reproducibility of the sandwiching position of the first member 41 in the direction X can be improved. As shown in 1500A, a right end portion of the long hole 41b has an arc shape, and the shape of the long hole 41a of the first member 41 is different.

In a case where the second member 42 (not shown) moves to the sandwiching position in a state where the long hole 41a of the first member 41 is in contact with the shaft 121a at two points, the sandwiching target member 26a is sandwiched by the claw portion 41c and the claw portion 422a and the sandwiching target member 26b is sandwiched by the claw portion 41d and the claw portion 422b. Accordingly, the first member 41 is biased upward in the direction Y via the sandwiching target member 26a and the sandwiching target member 26b and a lower side of the long hole 41b, which is shown by a tangent line TL2, and the shaft 121b come into contact with each other. Since the long hole 41b and the shaft 121b come into contact with each other, the position of the first member 41 in the direction Y can be fixed. Since the position of the first member 41 within a plane in the direction X and the direction Y is fixed by the pair formed by the shaft 121a and the long hole 41a and the pair formed by the shaft 121b and the long hole 41b, the reproducibility of the sandwiching position of the first member 41 can be improved.

In 1500A and 1500B, a distance L between a right end of the long hole 41b and a right end of a peripheral edge of the long hole 41b is shown. As shown in 1500B, in a state where the shaft 121a and the long hole 41a are in contact with each other at two points on a right end of the long hole 41a, there is a clearance because the shaft 121b and the right end of the long hole 41b are not in contact with each other. Accordingly, in a case where the first member 41 moves to the sandwiching position, the shaft 121b and the right end of the long hole 41b do not come into contact with each other and thus reliable two-point contact between the shaft 121a and the long hole 41a can be secured. Therefore, the reproducibility of the sandwiching position of the first member 41 can be further improved.

As described above, the first member 41 moves to the sandwiching position (position PA2), the second member 42 moves to the sandwiching position (position PB2) next so that the first member 41 and the second member 42 sandwich the sandwiching target members 26a and 26b as described above has been used as an example. In this case, it is preferable that the position of the first member 41 in the direction X is not changed by the movement of the second member 42 to the sandwiching position (position PB2). Therefore, it is preferable that a driving force for moving the first member 41 in a direction toward the sandwiching position (position PA2) is larger than a driving force for moving the second member 42 in a direction toward the sandwiching position (position PB2).

Figure 16:
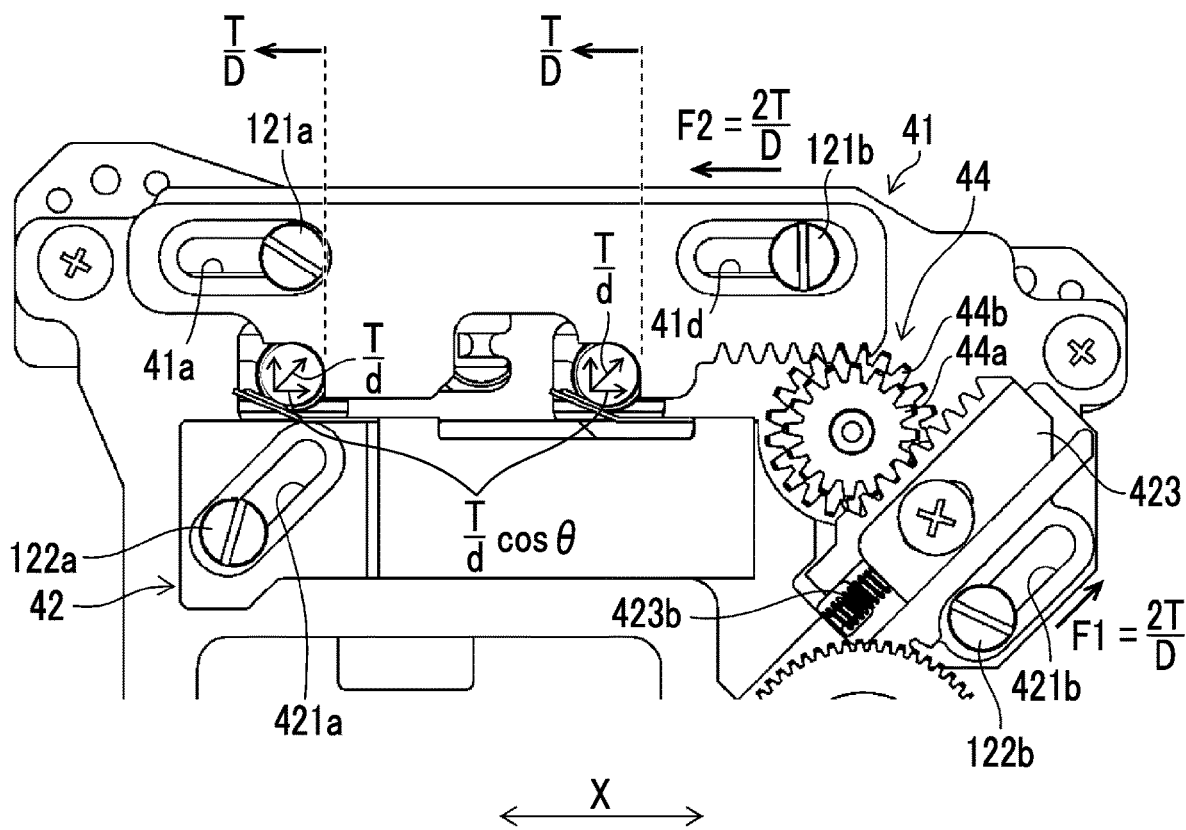
FIG. 16 is an enlarged view of the first member and the second member.

FIG. 16 is an enlarged view of the first member 41 and the second member 42. Based on FIG. 16, a relationship between the driving force for moving the first member 41 in the direction toward the sandwiching position (position PA2) and the driving force for moving the second member 42 in the direction toward the sandwiching position (position PB2) will be described.

FIG. 16 is a view for describing the relationship between the driving force for moving the first member 41 in the direction toward the sandwiching position (position PA2) and the driving force for moving the second member 42 in the direction toward the sandwiching position (position PB2).

As shown in FIG. 16, the charge member 423 is accommodated in the second member 42 to be movable in parallel with the direction of movement of the second member 42. Here, on an assumption that D/d is a gear ratio between the second gear 44b and the first gear 44a of the idler gear 44, a relationship of F2/d=F1/D is satisfied. F1 is a driving force for moving the second member 42, and F2 is a driving force for moving the first member 41. First, on an assumption that the driving force for moving the second member 42 to the sandwiching position is F1=2T/d, the driving force from the second member 42 that each of the sandwiching target members 26a and 26b receives is T/d. From the above relational expression, the driving force for moving the first member 41 to the sandwiching position is F2=2T/D, the driving force from the first member 41 that each of the sandwiching target members 26a and 26b receives is T/D.

As shown in FIG. 16, a component force (T/d)×cos θ in the direction X of T/d caused by the second member 42 and T/D of the first member 41 are driving forces that are parallel to the direction X and act in opposite directions. In a case where T/D>(T/d)×cos θ, that is, 1>(D/d)×cos θ is satisfied, the driving force of the first member 41 is more dominant than the second member 42 regarding forces applied to the sandwiching target members 26a and 26b in the direction X and the sandwiching position of the first member 41 is not displaced by the driving force of the second member 42. Therefore, the sandwiching position of the first member 41 can be fixed at a predetermined position. For example, in a case where θ=45°, D<d×(2)$^{1/2}$ is satisfied.

Next, preferable disposition positions of the sandwiching target members 26a and 26b in a case where the sandwiching target members 26a and 26b are sandwiched by the first member 41 and the second member 42 will be described.

Figure 17:
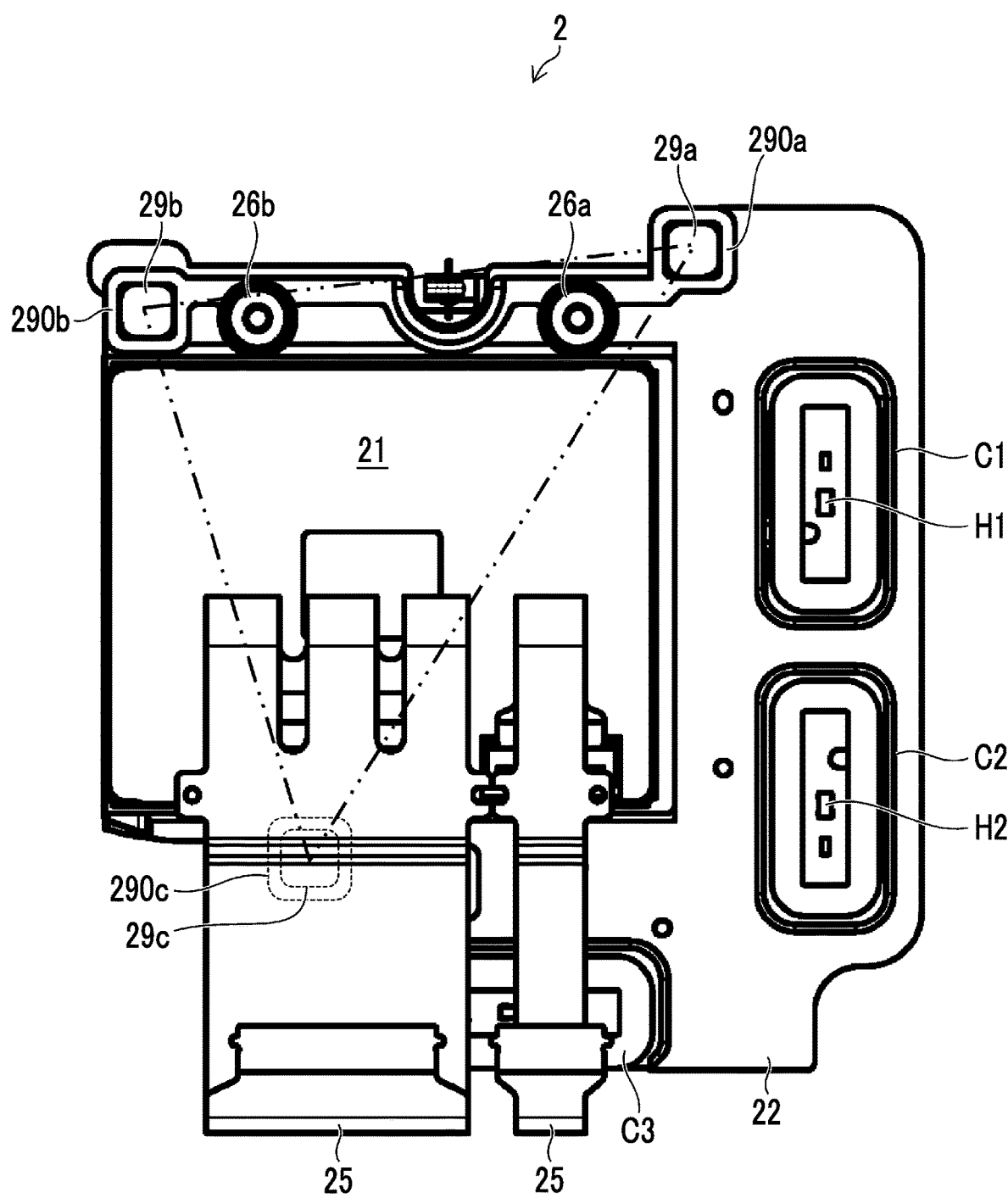
FIG. 17 is a plan view of the movable member as seen from the side opposite to the imaging optical system side.

FIG. 17 is a plan view of the movable member 2 as seen from the side opposite to the imaging optical system 103 side. As shown in FIG. 17, the movable member 2 includes the bottom surfaces 29a, 29b, and 29c which are three ball receiving surfaces for accommodation of spherical balls. The sandwiching target members 26a and 26b are disposed inside a virtual triangle formed by the three bottom surfaces 29a, 29b, and 29c.

The claw portions 41c and 41d of the first member 41 and the claw portions 422a and 422b of the second member 42 come into line-contact with the sandwiching target members 26a and 26b in the direction Z. It is preferable that a contact line direction coincides with the optical axis OA. Meanwhile, in a case where there is a variation between the component shapes of the claw portions 41c and 41d, the claw portions 422a and 422b, and the sandwiching target members 26a and 26b, the contact line direction becomes a direction that forms an angle with the optical axis OA (direction not parallel to optical axis OA). Therefore, in a case where the sandwiching target member 26a is sandwiched by the claw portion 41c and the claw portion 422a or in a case where the sandwiching target member 26b is sandwiched by the claw portion 41d and the claw portion 422b, an unintended force that tilts the light-receiving surface 20a is generated. Therefore, in a case where the sandwiching target members 26a and 26b are disposed inside the virtual triangle formed by the bottom surfaces 29a, 29b, and 29c, a force tilting the light-receiving surface 20a can be supported by three rolling bodies (spherical balls) disposed in the bottom surfaces 29a, 29b, and 29c, and thus a tilt of the light-receiving surface 20a can be suppressed.

Next, a movement restriction member 4A according to another aspect will be described with reference to FIGS. 18 and 19. FIG. 18 is a plan view for describing the movement restriction member 4A according to the other aspect. The configurations of the first member 41 and the second member 42 of the movement restriction member 4A are different from those of the movement restriction member 4 shown in FIGS. 12 and 13. Note that, portions having the same functions as those of the above-described movement restriction member 4 will be given the same reference numerals, so that detailed description thereof will be omitted and points different from other embodiments will be mainly described.

1800A shows a state where the first member 41 and the second member 42 are at the non-sandwiching positions separated from the sandwiching target members 26a and 26b provided on the movable member 2. 1800B shows a state where the first member 41 and the second member 42 are at the sandwiching positions at which the first member 41 and the second member 42 sandwich the sandwiching target members 26a and 26b provided on the movable member 2.

Figure 19:
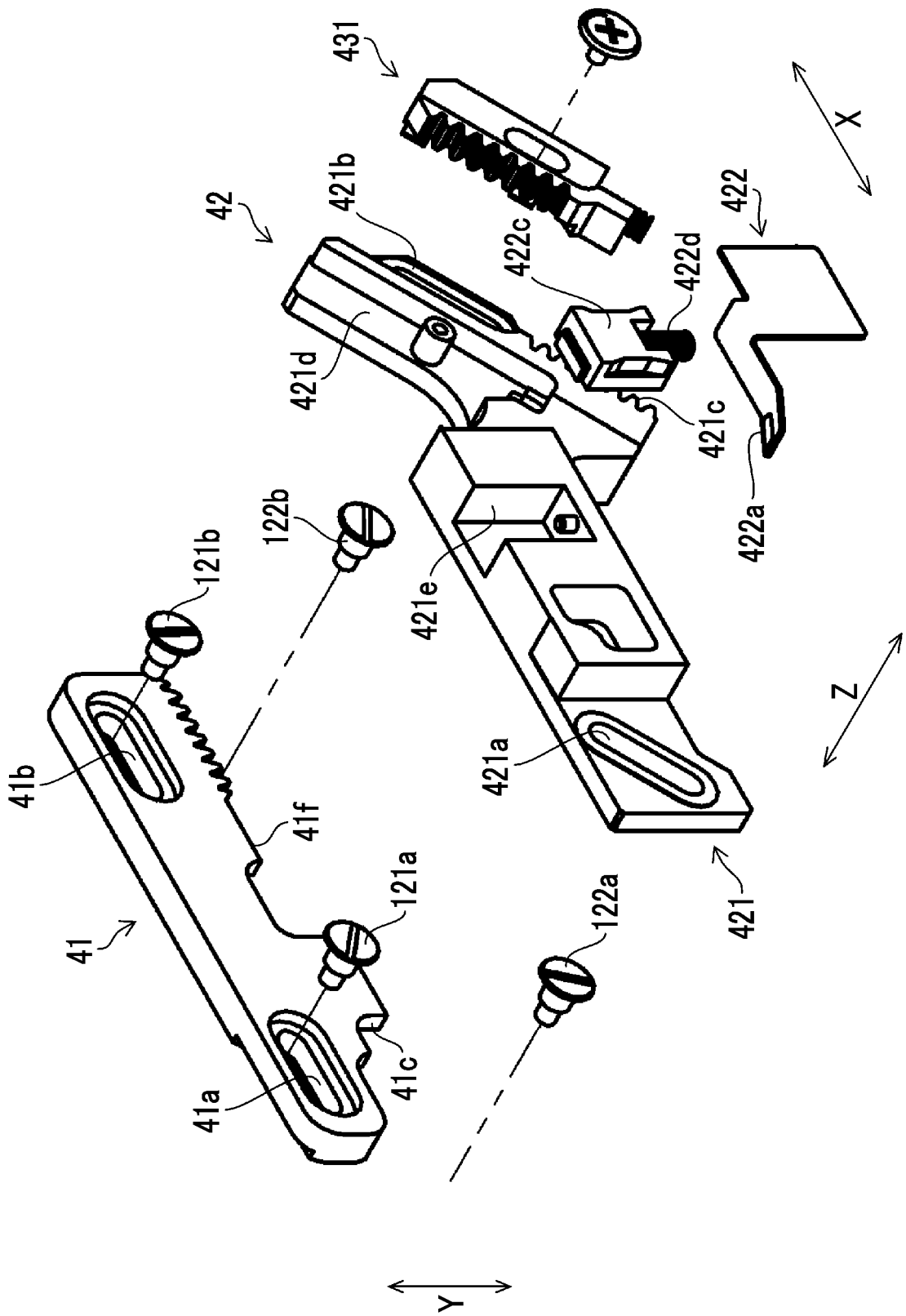
FIG. 19 is an exploded perspective view for describing a first member and a second member according to the other aspect.

As shown in FIGS. 18 and 19, a claw portion 41f that comes into contact with the sandwiching target member 26b of the first member 41 is composed of an approximately flat surface facing a lower side in the direction Y. The plate-shaped elastic member 422 including only the claw portion 422a that comes into contact with the sandwiching target member 26a is attached to the body portion 421 of the second member 42. In the body portion 421 of the second member 42, a claw portion 422c that comes into contact with the sandwiching target member 26b is disposed in an accommodation portion 421e of the body portion 421. The claw portion 422c has an approximately rectangular parallelepiped shape, and a region that comes into contact with the sandwiching target member 26b is composed of an approximately flat surface facing an upper side in the direction Y. An elastic member 422d that biases the claw portion 422c upward in the direction Y is disposed between a bottom surface of the accommodation portion 421e and the claw portion 422c.

As shown in 1800B, in a case where the first member 41 and the second member 42 move from the non-sandwiching positions to the sandwiching positions, the sandwiching target member 26a is sandwiched by the first member 41 and the second member 42 at three points. Meanwhile, the sandwiching target member 26b is sandwiched by the claw portion 41f and the claw portion 422c at two points. As with the movement restriction member 4, the claw portion 422a biases the sandwiching target member 26a toward the claw portion 41c and the claw portion 422c biases the sandwiching target member 26b toward the claw portion 41f. The sandwiching target member 26a and the sandwiching target member 26b can be stably held by the first member 41 and the second member 42.

Figure 20:
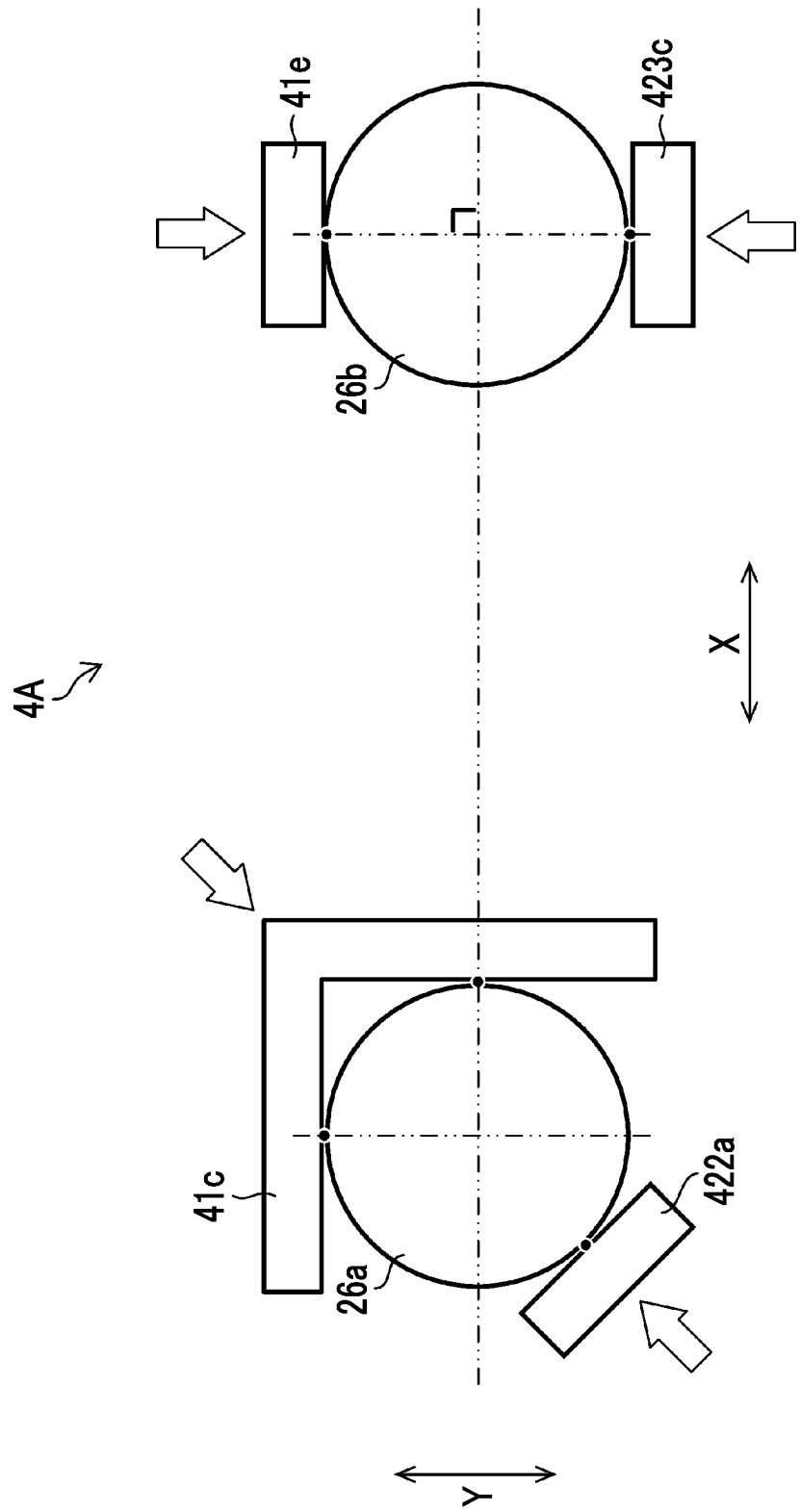
FIG. 20 is a view for describing the disposition positions of claw portions and a sandwiching target member.

FIG. 20 is a view for describing the disposition positions of the sandwiching target member 26a, the sandwiching target member 26b, the claw portion 41c, the claw portion 422a, the claw portion 41f, and the claw portion 422c of the movement restriction member 4A.

As shown in FIG. 20, the sandwiching target member 26a is sandwiched by the claw portion 41c and the claw portion 422a at three points. The sandwiching target member 26b is sandwiched by the claw portion 41d and the claw portion 422c at two points.

A direction in which the claw portion 41d and the claw portion 422c sandwich the sandwiching target member 26b is the direction Y approximately orthogonal to the direction X. Therefore, in a case where the claw portion 41d and the claw portion 422c sandwich the sandwiching target member 26b, a component force parallel to the direction X is almost not generated. Therefore, even in a case of being sandwiched by the claw portion 41d and the claw portion 422c, a driving force that moves the first member 41 in a direction opposite to a direction toward the sandwiching position is almost not generated. Therefore, the reproducibility of the sandwiching position of the first member 41 can be improved.

FIG. 21 is a cross-sectional view taken along line 21-21 in FIG. 18. FIG. 21 is a cross-sectional view of the claw portion 41f, the sandwiching target member 26a, and the claw portion 422c.

As described above, the claw portions and the sandwiching target members come into line-contact with each other with an angle formed by the optical axis OA. Therefore, in a case where the sandwiching target members 26a and 26b are sandwiched by the first member 41 and the second member 42, the light-receiving surface 20a (not shown) may be tilted.

As shown in 2100A, the sandwiching target member 26b includes protruding portions 26c that protrude toward the claw portion 41f of the first member 41 and the claw portion 422c of the second member 42. The protruding portions 26c are provided in the circumferential direction of an outer peripheral surface of the sandwiching target member 26b. Each protruding portion 26c is formed, for example, in a dome shape with a top portion as seen in a cross-sectional view. Point-contact can be made at the top portion.

In a case where the protruding portions 26c are brought into contact with the claw portion 41f and the claw portion 422c, two-point point-contact is made. With a change from line-contact to point-contact, generation of an unintended force that tilts the light-receiving surface 20a can be suppressed.

In the case of 2100B, the claw portion 41f includes a protruding portion 41g that comes into contact with the sandwiching target member 26b. In addition, the claw portion 422c includes a protruding portion 422e that comes into contact with the sandwiching target member 26b. In a case where the protruding portion 41g and the protruding portion 422e are brought into contact with the sandwiching target member 26b, two-point point-contact is made. With a change from line-contact to point-contact, generation of an unintended force that tilts the light-receiving surface 20a can be suppressed. Each of the protruding portions 26c, 41g, and 422e is formed, for example, in a dome shape with a top portion as seen in a cross-sectional view. Point-contact can be made at the top portion.

Next, adjustment for causing the center P of the imaging element 20 and the optical axis OA of the imaging optical system 103 to coincide with each other will be described with reference to FIGS. 22 and 23.

Figure 22:
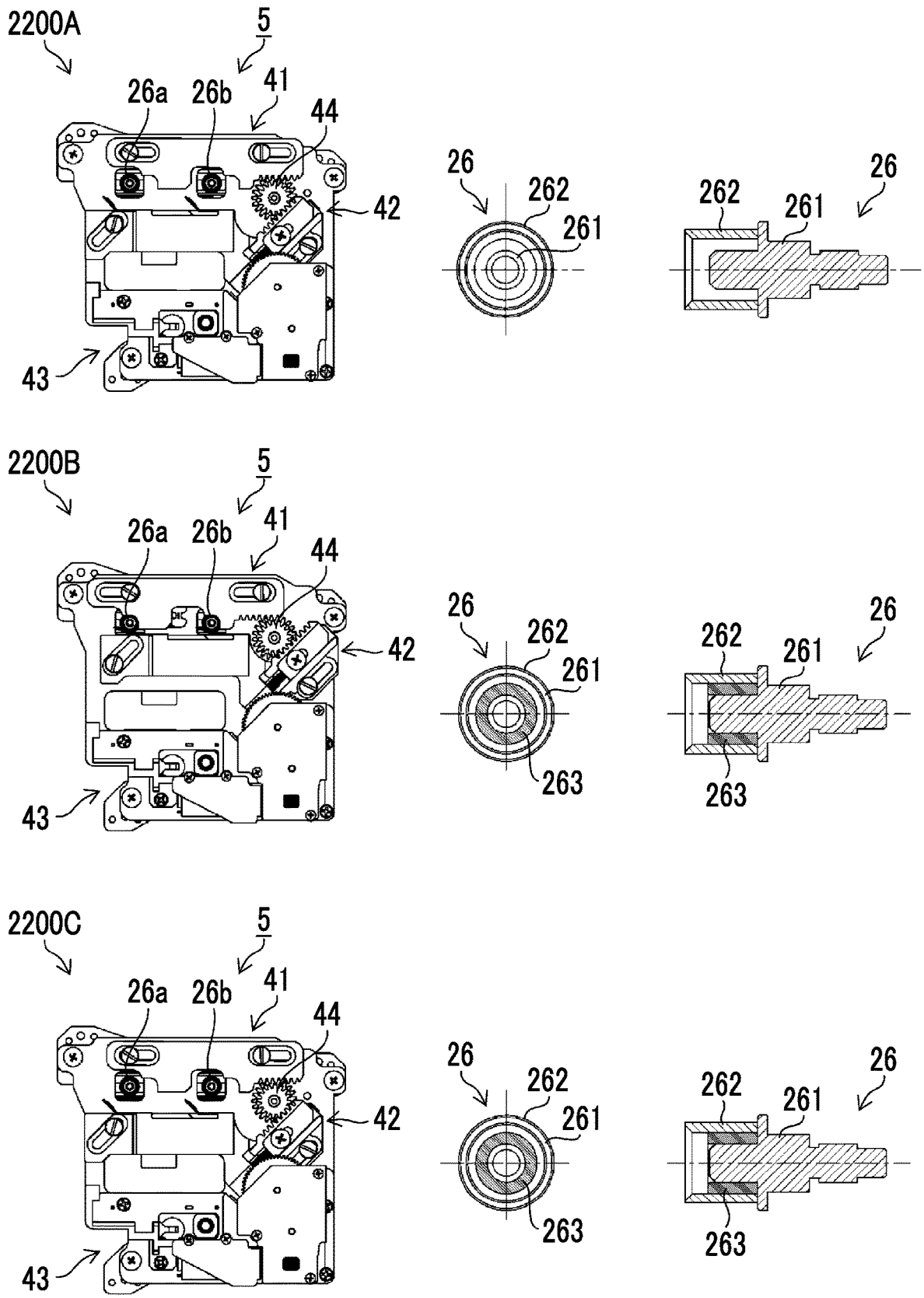
FIG. 22 is a view for describing adjustment in which the center of an imaging element and an optical axis of an imaging optical system 103 are caused to coincide with each other.

2200A in FIG. 22 shows a state before adjustment in which the center P of the imaging element 20 and the optical axis OA of the imaging optical system 103 are caused to coincide with each other. Regarding the imaging unit 5, the light-receiving surface 20a is set to face a lower side in the direction of gravitational force. Each sandwiching target member 26 is composed of a shaft 261 and a tubular member 262 that surrounds a periphery of the shaft 261. The shaft 261 corresponds to a third member, and the tubular member 262 corresponds to a fourth member having a tubular shape. There is a gap between the shaft 261 and the tubular member 262, and the gap is filled with an ultraviolet-curable adhesive 263. Note that, the ultraviolet-curable adhesive 263 is not hardened.

As shown in 2200B, the movable member 2 is moved as a VCM is driven and the center P of the imaging element 20 and the optical axis OA of the imaging optical system 103 coincide with each other. The first member 41 and the second member 42 are moved to the sandwiching positions. The tubular members 262 are positioned by being sandwiched by the first member 41 and the second member 42. Meanwhile, since the shafts 261 are fixed to the movable member 2, the shafts 261 are positioned as the VCM is driven. In a state before adjustment, the tubular members 262 and the shafts 261 are positioned separately from each other. In 2200B, the centers of the shafts 261 and the tubular members 262 coincide with each other. In this state, the ultraviolet-curable adhesives 263 are hardened by being irradiated with ultraviolet rays. Accordingly, the shafts 261 and the tubular members 262 are fixed.

As shown in 2200C, the first member 41 and the second member 42 are moved to the non-sandwiching positions to finish adjustment for causing the center P of the imaging element 20 and the optical axis OA of the imaging optical system 103 to coincide with each other.

Next, another aspect will be described with reference to FIG. 23. As with 2200A in FIG. 22, 2300A in FIG. 23 shows a state before adjustment in which the center P of the imaging element 20 and the optical axis OA of the imaging optical system 103 are caused to coincide with each other. Spaces between the shafts 261 and the tubular members 262 are filled with the ultraviolet-curable adhesives 263.

As shown in 2300B, the movable member 2 is moved as the VCM is driven and the center P of the imaging element 20 and the optical axis OA of the imaging optical system 103 coincide with each other. The first member 41 and the second member 42 are moved to the sandwiching positions. The tubular members 262 are positioned by being sandwiched by the first member 41 and the second member 42. Since the shafts 261 are fixed to the movable member 2, the shafts 261 are positioned as the VCM is driven. In a state before adjustment, the tubular members 262 and the shafts 261 are positioned separately from each other. In 2300B, the centers of the shafts 261 and the tubular members 262 do not coincide with each other because of component tolerances and the like, and thus the tubular members 262 are moved to positions separated from the centers of the shafts 261 by being sandwiched by the first member 41 and the second member 42. Since the ultraviolet-curable adhesives 263 are not hardened, the tubular members 262 can be moved. In this state, the ultraviolet-curable adhesives 263 are hardened by being irradiated with ultraviolet rays. Accordingly, the shafts 261 and the tubular members 262 are fixed.

As shown in 2300C, the first member 41 and the second member 42 are moved to the non-sandwiching positions to finish adjustment for causing the center P of the imaging element 20 and the optical axis OA of the imaging optical system 103 to coincide with each other.

Figure 23:
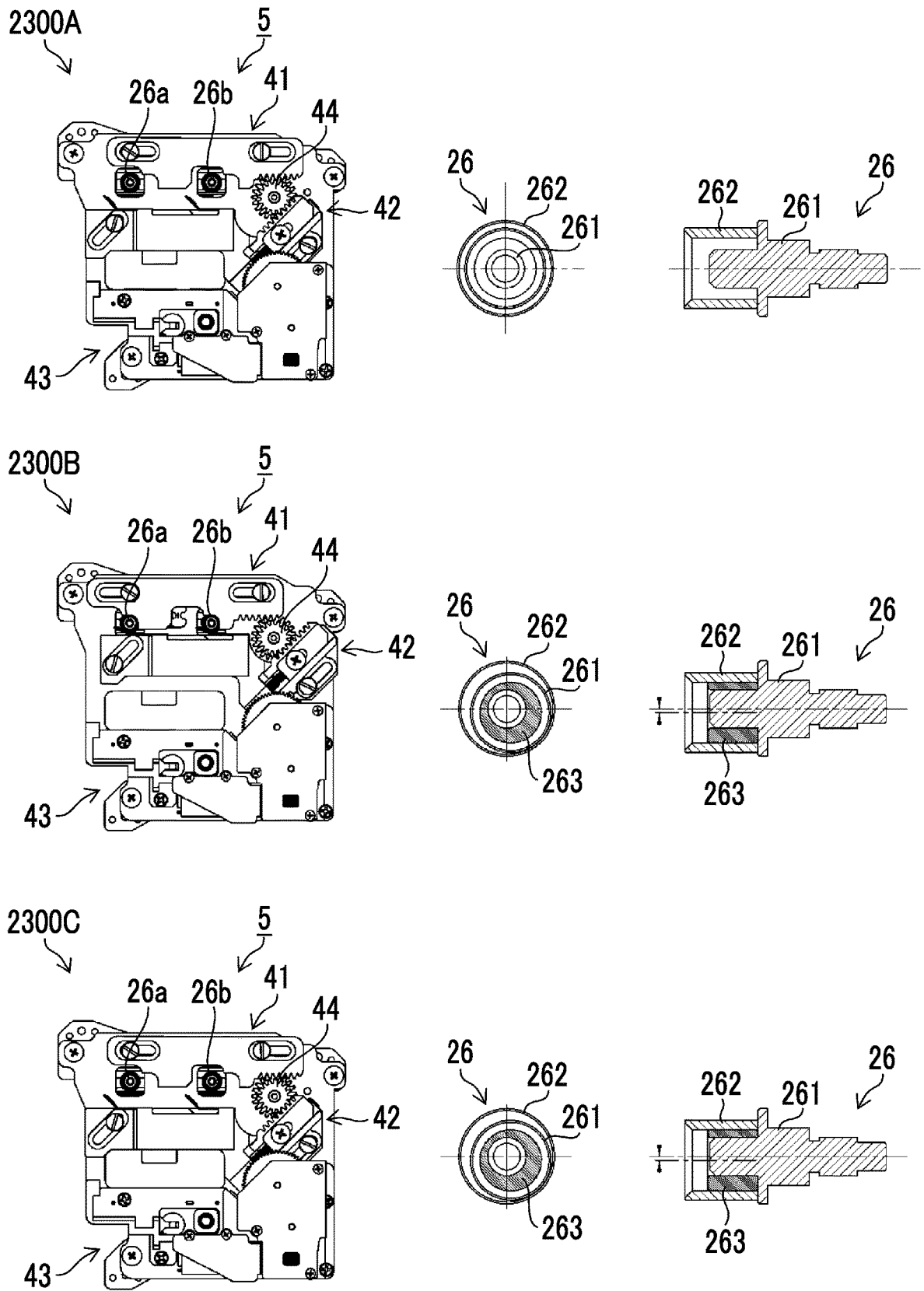
FIG. 23 is a view for describing adjustment in which the center of the imaging element and the optical axis of an imaging optical system 103 are caused to coincide with each other.

As shown in FIGS. 22 and 23, since the shafts 261 and the tubular members 262 serving as adjustment members and the ultraviolet-curable adhesives 263 with which the gaps are filled are used, it is ensured that the center P of the imaging element 20 and the optical axis OA of the imaging optical system 103 coincide with each other in a case where the sandwiching target members 26 are sandwiched by the first member 41 and the second member 42.

In a case where the shafts 261 and the tubular members 262 are simply fixed in a state where the centers of the shafts 261 and the tubular members 262 coincide with each other without adjustment as described above, the tubular members 262 are moved by being sandwiched by the first member 41 and the second member 42 and the shafts 261 are also moved because of the movement of the tubular members 262 in a case where the sandwiching target members 26 are sandwiched by the first member 41 and the second member 42. As a result, a state where the center P of the imaging element 20 and the optical axis OA of the imaging optical system 103 do not coincide with each other occurs. In a case where the first member 41 and the second member 42 are at the non-sandwiching positions, the center P of the imaging element 20 and the optical axis OA of the imaging optical system 103 coincide with each other because of the VCM. However, in a case where the first member 41 and the second member 42 are at the sandwiching positions, the center P of the imaging element 20 and the optical axis OA of the imaging optical system 103 do not coincide with each other, which may affect an imaging range.

Application of the adjustment members as in the embodiment can suppress the occurrence of such a problem.

As another preferred embodiment, it is preferable that the movable member 2, the sandwiching target members 26, and the first member 41 and/or the second member 42 coming into contact with the sandwiching target members 26 are composed of members having a high thermal conductivity. Accordingly, in a case where the sandwiching target members 26 are sandwiched by the first member 41 and the second member 42, heat generated from the imaging element 20 and the circuit board 21 can be discharged to an exterior of an electronic apparatus via the base 22, the sandwiching target members 26, and the first member 41 and/or the second member 42. In a case where the movement of the movable member 2 is restricted by the movement restriction member 4, it is not necessary to use the VCM provided on the movable member 2 and thus power consumption becomes zero, which is advantageous with respect to heat generation.

Next, control of the operation of the movement restriction member 4 (4A) will be described. The operation of the movement restriction member 4 (4A) can be controlled by the system control unit 108 that functions as a processor.

The system control unit 108 controls whether or not the movement restriction member 4 (4A) restricts the movement of the movable member 2 in a case where a specific condition is received.

The specific condition is, for example, the state of a power supply. The system control unit 108 controls the movement restriction member 4 (4A) such that the movement restriction member 4 (4A) restricts the movement of the movable member 2 in a case where the power supply is turned off (OFF). Since the sandwiching target members 26 are sandwiched by the first member 41 and the second member 42 in a state where the power supply is off (OFF), it is possible to prevent the movable member 2 from moving while the digital camera 100 is being carried.

The specific condition is the state of operation with respect to the user interface unit of the operation unit 110. In a case where a user's operation is received through the operation unit 110, the system control unit 108 performs control such that the movement restriction member 4 (4A) restricts the movement of the movable member 2. It is possible to control whether to restrict the movement of the movable member 2 based on the intention of the user.

The specific condition is the result of detection from a sensor that detects the acceleration, the sensor being included in the movement detection sensor 106. In a case where the sensor detects an acceleration exceeding a range in which the movement of the movable member 2 is allowed, the system control unit 108 performs control such that the movement restriction member 4 restricts movement of the movable member 2.

In particular, in a case where an imaging operation is performed in a case where the digital camera 100 is fixed to a vehicle such as an automobile or a motorcycle, a large acceleration (for example, acceleration of 3G or more) may act on the camera body 101 because of an impact caused when the vehicle travels. Generally, in a state where the image shake correction device 3 is off (OFF), the center P of the light-receiving surface 20a and the optical axis OA of the imaging optical system 103 are held so as to coincide with each other by the VCM. However, in a case where a large acceleration acts on the camera body 101, an inertial force attributable to the impact of the movable member 2 becomes larger than the center holding force of the VCM, which causes an image shake in a case where a motion picture is captured.

In addition, in recent years, the digital camera 100 is mounted on a drone for aerial photography in many cases. In the case of a large drone that flies with a camera such as a single-lens reflex camera or a mirrorless camera mounted thereon as described above, a very large acceleration (acceleration of 7G or more) acts on the camera body 101 during a sharp turn and thus it is necessary to hold the imaging element 20 with a force larger than an inertial force.

Therefore, an image shake can be prevented since the system control unit 108 performs control such that the movement restriction member 4 restricts movement of the movable member 2 in a case where the sensor detects an acceleration exceeding a range in which the movement of the movable member 2 is allowed.

The specific condition is the result of detection from a sensor that detects an acceleration, the sensor being included in the movement detection sensor 106. In a case where no acceleration is detected for a certain time, it is determined that the imaging operation is being performed by using a tripod and the system control unit 108 performs control such that the movement restriction member 4 restricts the movement of the movable member 2. In the case of an imaging operation with a tripod, the movement restriction member 4 restricts the movement of the movable member 2 since it is not necessary to operate the image shake correction device 3.

EXPLANATION OF REFERENCES

1: Support member
1A: First support member
1-A: Claw portion
1B: Second support member
1-B: Claw portion
2: Movable member
3: Image shake correction device
4: Movement restriction member
4A: Movement restriction member
5: Imaging unit
10: Base
11a: Through-hole
11b: Through-hole
11c: Through-hole
11d: Through-hole
11e: Through-hole
12: Reflective type photosensor
14: Yoke
15a: Flat surface
15b: Flat surface
15c: Flat surface
16: Hook
17a: Protrusion portion
17b: Protrusion portion
17c: Protrusion portion
17d: Protrusion portion
18: Yoke
19a: Hole portion
19b: Hole portion
19c: Hole portion
19d: Hole portion
20: Imaging element
20a: Light-receiving surface
21: Circuit board
21a: Connector
22: Base
23a: Hook
23b: Hook
24a: Spring
24b: Spring
25: Flexible print substrate
26: Sandwiching target member
26a: Sandwiching target member
26b: Sandwiching target member
26c: Protruding portion
28: Insertion member
29a: Bottom surface
29b: Bottom surface
29c: Bottom surface
41: First member
41a: Long hole
41b: Long hole
41c: Claw portion
41d: Claw portion
41e: Rack gear
41f: Claw portion
41g: Protruding portion
42: Second member
43: Gear unit
44: Idler Gear
44a: First gear
44b: Second gear
100: Digital camera
101: Camera body
102: Interchangeable lens
103: Imaging optical system
105: Imaging element drive unit
106: Detection sensor
107: Image processing unit
108: System control unit
110: Operation unit
111: Display unit
121a: Shaft
121b: Shaft
122a: Shaft
122b: Shaft
261: Shaft
262: Tubular member
263: Ultraviolet-curable adhesive
290a: Recess portion
290b: Recess portion
290c: Recess portion
421: Body portion
421a: Long hole
421b: Long hole
421c: Rack gear
421d: Accommodation portion
421e: Accommodation portion
422: Elastic member
422a: Claw portion
422b: Claw portion
422c: Claw portion
422d: Elastic member
422e: Protruding portion
423: Charge member
423a: Rack gear
423b: Elastic member 431: Motor
432: Worm gear
433: Worm wheel
433a: First wheel
433b: Second wheel
434: Reduction gear
434a: First gear
434b: Second gear
435: Gearbox
435a: Accommodation portion
435b: First shaft
435c: Second shaft
435d: Hook
436: Motor cover
437: Gear cover

What is claimed is:

1. An imaging apparatus comprising:
a movable member that includes an imaging element;
a support member that supports the movable member within a plane that intersects an optical axis of the imaging element; and
a movement restriction member that includes a first member and a second member,
wherein the first member and the second member move between sandwiching positions at which the first member and the second member sandwich a sandwiching target member provided on the movable member and non-sandwiching positions separated from the sandwiching target member,
at the sandwiching positions, the first member and the second member sandwich the sandwiching target member at at least two or more points, and
the first member reaches the sandwiching position earlier than the second member in a case where the first member moves to the sandwiching position from the non-sandwiching position.

2. An imaging apparatus comprising:
a movable member that includes an imaging element;
a support member that supports the movable member within a plane that intersects an optical axis of the imaging element; and
a movement restriction member that includes a first member and a second member,
wherein the first member and the second member move between sandwiching positions at which the first member and the second member sandwich a sandwiching target member provided on the movable member and non-sandwiching positions separated from the sandwiching target member,
at the sandwiching positions, the first member and the second member sandwich the sandwiching target member at at least two or more points, and
the first member and the second member are different from each other in distance of movement between the sandwiching position and the non-sandwiching position and/or the first member and the second member are different from each other in speed of movement between the sandwiching position and the non-sandwiching position.

3. An imaging apparatus comprising:
a movable member that includes an imaging element;
a support member that supports the movable member within a plane that intersects an optical axis of the imaging element; and
a movement restriction member that includes a first member and a second member,
wherein the first member and the second member move between sandwiching positions at which the first member and the second member sandwich a sandwiching target member provided on the movable member and non-sandwiching positions separated from the sandwiching target member,
at the sandwiching positions, the first member and the second member sandwich the sandwiching target member at at least two or more points, and
a driving force that moves the first member in a direction toward the sandwiching position is larger than a driving force that moves the second member in a direction toward the sandwiching position.

4. The imaging apparatus according to claim 3,
wherein the first member and the second member sandwich the sandwiching target member at three points, and
a triangle connecting the three points is an acute-angled triangle.

5. The imaging apparatus according to claim 3,
wherein a longitudinal direction of the sandwiching target member is parallel to the optical axis, and
the first member and the second member move between the sandwiching positions and the non-sandwiching positions within the plane intersecting the optical axis.

6. The imaging apparatus according to claim 5,
wherein the first member and the second member move in different directions within the plane intersecting the optical axis.

7. The imaging apparatus according to claim 3,
wherein at least two sandwiching target members are provided, and
the first member comes into contact with at least one of the at least two sandwiching target members at two points.

8. The imaging apparatus according to claim 3, further comprising:
a processor that controls operation of the movement restriction member,
wherein the processor controls whether or not the movement restriction member restricts movement of the movable member in accordance with a specific condition.

9. The imaging apparatus according to claim 8,
wherein the imaging apparatus comprises a power supply, and
the specific condition is a state of the power supply.

10. The imaging apparatus according to claim 8,
wherein the imaging apparatus comprises a user interface unit, and
the specific condition is a state of operation with respect to the user interface unit.

11. The imaging apparatus according to claim 8,
wherein the imaging apparatus comprises a sensor that detects an acceleration, and
the processor performs control such that the movement restriction member restricts movement of the movable member in a case where the sensor detects an acceleration exceeding a range in which the movement of the movable member is allowed.

12. The imaging apparatus according to claim 11,
wherein the specific condition is a state of output of the sensor.

13. An imaging apparatus comprising:
a movable member that includes an imaging element;

a support member that supports the movable member within a plane that intersects an optical axis of the imaging element; and a movement restriction member that includes a first member and a second member, wherein the first member and the second member move between sandwiching positions at which the first member and the second member sandwich a sandwiching target member provided on the movable member and non-sandwiching positions separated from the sandwiching target member, at the sandwiching positions, the first member and the second member sandwich the sandwiching target member at at least two or more points, the first member includes two long holes into which two shafts provided on the support member are inserted, and at the sandwiching position, one of the two shafts and one of the two long holes come into contact with each other at two points.

14. The imaging apparatus according to claim 13, wherein the second member includes at least one elastic member, and at the sandwiching position, the elastic member biases at least one of the sandwiching target members.

15. An imaging apparatus comprising:

a movable member that includes an imaging element;

a support member that supports the movable member within a plane that intersects an optical axis of the imaging element; and a movement restriction member that includes a first member and a second member, wherein the first member and the second member move between sandwiching positions at which the first member and the second member sandwich a sandwiching target member provided on the movable member and non-sandwiching positions separated from the sandwiching target member, at the sandwiching positions, the first member and the second member sandwich the sandwiching target member at at least two or more points, and the sandwiching target member includes an adjustment member for causing a center of the imaging element and an optical axis of an imaging optical system to coincide with each other.

16. The imaging apparatus according to claim 15, wherein the adjustment member consists of a third member provided on the movable member and a fourth member having a tubular shape, and a gap between the third member and the fourth member is filled with an ultraviolet-curable adhesive.

17. An imaging apparatus comprising:

a movable member that includes an imaging element;

a support member that supports the movable member within a plane that intersects an optical axis of the imaging element; and a movement restriction member that includes a first member and a second member, wherein the first member and the second member move between sandwiching positions at which the first member and the second member sandwich a sandwiching target member provided on the movable member and non-sandwiching positions separated from the sandwiching target member, at the sandwiching positions, the first member and the second member sandwich the sandwiching target member at at least two or more points, the movable member includes three ball receiving surfaces that accommodate the support member or three balls disposed between the movable member and the support member, and the sandwiching target member is disposed inside a virtual triangle formed by the three ball receiving surfaces.

* * * * *